(12) United States Patent
Yu

(10) Patent No.: US 11,970,074 B2
(45) Date of Patent: Apr. 30, 2024

(54) BATTERY CHARGING AND SWAPPING SYSTEM

(71) Applicant: Kuo-Chen Yu, Chiayi (TW)

(72) Inventor: Kuo-Chen Yu, Chiayi (TW)

(73) Assignee: Kuo-Chen Yu, Chiayi (TW)

( * ) Notice: Subject to any disclaimer, the term of this patent is extended or adjusted under 35 U.S.C. 154(b) by 372 days.

(21) Appl. No.: 17/559,541

(22) Filed: Dec. 22, 2021

(65) Prior Publication Data

US 2022/0203854 A1    Jun. 30, 2022

(30) Foreign Application Priority Data

Dec. 24, 2020   (CN) .......................... 202011551153.7

(51) Int. Cl.
| | |
|---|---|
| *H01M 10/46* | (2006.01) |
| *B60L 53/30* | (2019.01) |
| *B60L 53/80* | (2019.01) |
| *H02J 7/00* | (2006.01) |

(52) U.S. Cl.
CPC .............. *B60L 53/30* (2019.02); *B60L 53/80* (2019.02); *H02J 7/0013* (2013.01); *H02J 7/0044* (2013.01)

(58) Field of Classification Search
CPC ...... H02J 7/0013; H02J 7/0044; H02J 7/0042; H02J 7/0045; B60L 53/80; B60L 53/30; Y02T 10/70

USPC ........ 320/104, 109, 114, 116, 117, 118, 119, 320/121; 414/280, 281, 285; 104/34
See application file for complete search history.

(56) References Cited

U.S. PATENT DOCUMENTS

2007/0113921 A1*   5/2007   Capizzo ................. B60L 53/80
                                                          141/231

FOREIGN PATENT DOCUMENTS

| CN | 102202944 A | * | 9/2011 | ............... B60K 1/04 |
| JP | 2018518421 A | * | 7/2018 | |
| WO | WO-2010033883 A1 | * | 3/2010 | ............... B60K 1/04 |
| WO | WO-2019100658 A1 | * | 5/2019 | ............... B60K 1/04 |

* cited by examiner

*Primary Examiner* — Edward Tso
(74) *Attorney, Agent, or Firm* — Fish & Richardson P.C.

(57) ABSTRACT

A battery charging and swapping system includes a plurality of charging seats, a first charging station, a first charging rail and a first conveying unit. The charging seats are operable to enter a first conveying space defined by the first charging station so as to be stored. The first charging rail is disposed at the first charging station, and supplies electrical energy to the charging seats. Via the first conveying unit, when one of the charging seats entering the first conveying space is carried and moved by the first conveying unit, at least one of the rest of the charging seats in the first conveying space is pushed by the one of the charging seats to move along the first conveying space.

12 Claims, 20 Drawing Sheets

BATTERY CHARGING AND SWAPPING SYSTEM

CROSS-REFERENCE TO RELATED APPLICATION

This application claims priority to Chinese Invention Patent Application No. 202011551153.7, filed on Dec. 24, 2020.

FIELD

The disclosure relates to a battery charging and swapping system, and more particularly to a battery charging and swapping system for batteries used in electric vehicles.

BACKGROUND

In recent years, in addition to small electronic devices (e.g., digital cameras and smartphones), rechargeable batteries are being used in large devices, such as electric vehicles. Generally, a rechargeable battery used in an electric vehicle is called an electric-vehicle battery, and has much higher capacity than a rechargeable battery used in a small electronic device. Because current battery charging technology is not yet advanced enough to promptly charge rechargeable batteries, it still requires a relatively long time to charge the electric-vehicle battery sufficiently, in order to ensure that the electric-vehicle battery is able to power an electric vehicle to travel a required distance before the electric-vehicle battery needs to be recharged.

Consequently, a conventional battery charging and swapping system that includes a charging station has been adopted for electric scooters. With the conventional battery charging and swapping system, electric scooter drivers may simply swap their electric-vehicle batteries manually for fully-charged electric-vehicle batteries that are stored in the charging station. That is to say, the electric scooter drivers do not have to spend time on charging the electric-vehicle batteries. However, the electric-vehicle batteries used in electric scooters and the electric-vehicle batteries used in electric cars differ greatly in terms of size and weight. The conventional battery charging and swapping system that requires drivers to manually swap the electric-vehicle batteries may not be suitable for electric cars since the electric-vehicle batteries used in electric cars are too heavy for electric car drivers to swap manually. Furthermore, due to the large size of the electric-vehicle batteries used in electric cars, the conventional battery charging and swapping system may not be able to effectively store a large number of huge electric-vehicle batteries.

SUMMARY

Therefore, an object of the disclosure is to provide a battery charging and swapping system that can alleviate at least one of the drawbacks of the prior art.

According to the disclosure, the battery charging and swapping system is adapted for charging and storing a plurality of batteries, and includes a plurality of charging seats and a battery charging subsystem. The charging seats are adapted for carrying the batteries, and are adapted for being electrically coupled to the batteries to charge the batteries. The battery charging subsystem includes at least one first battery charging apparatus. The at least one first battery charging apparatus provides accommodation for the charging seats, conveys the charging seats, and includes a first battery charging unit and a first conveying unit. The first battery charging unit includes a first charging station and a first charging rail. The first charging station defines a first conveying space. The charging seats are operable to enter the first conveying space so as to be stored. The first charging rail is disposed at the first charging station, and is electrically coupled to the charging seats to supply electrical energy to the charging seats. The first conveying unit is disposed at the first charging station and is operable to carry and convey the charging seats that enter the first conveying space. Via the first conveying unit, when one of the charging seats entering the first conveying space is carried and moved by the first conveying unit, at least one of the rest of the charging seats that is in the first conveying space is pushed by the one of the charging seats to move along the first conveying space.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
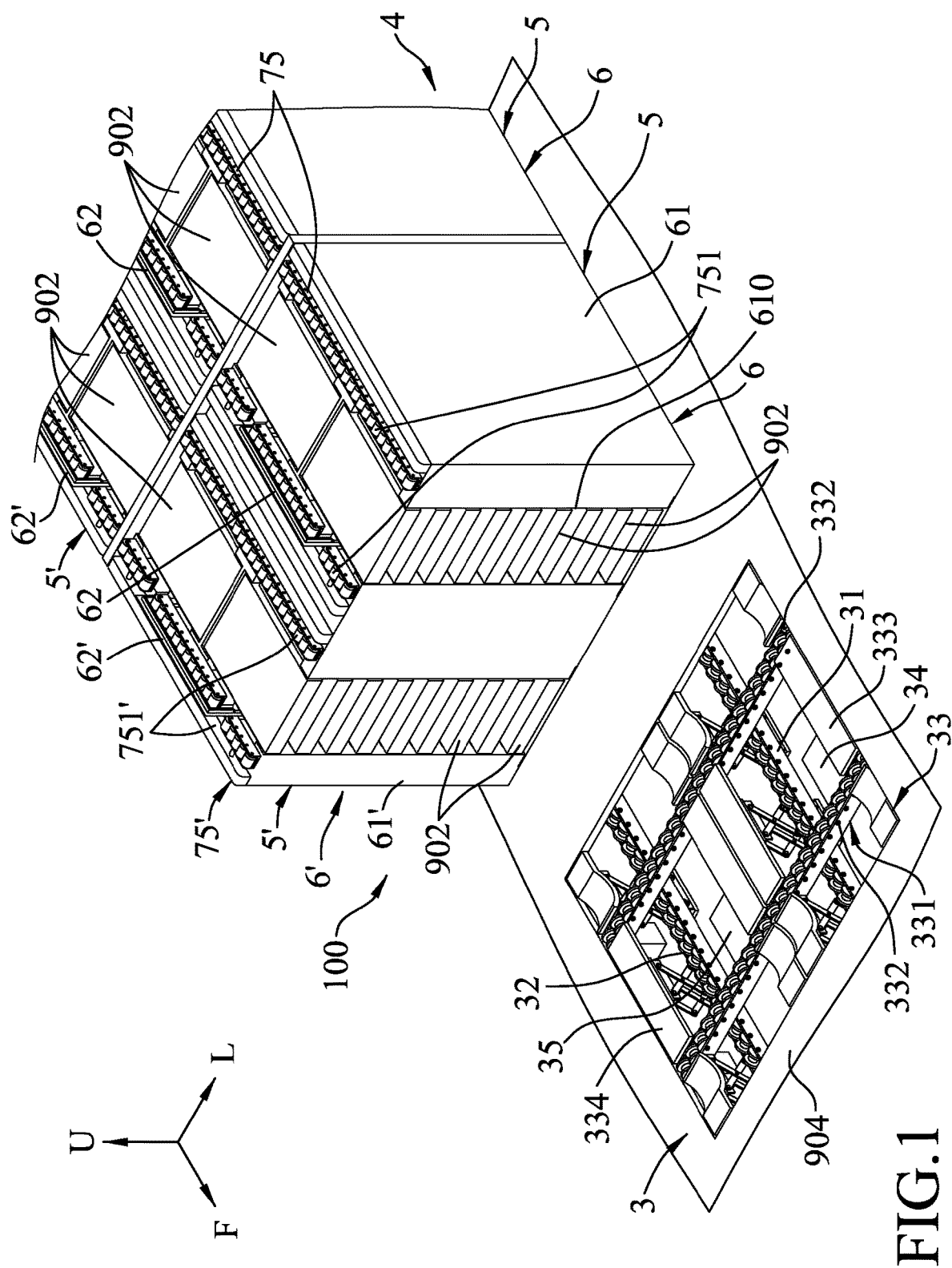
FIG. 1 is a fragmentary perspective view of an embodiment of a battery charging and swapping system according to the disclosure.

Referring to FIGS. 1, 2, 4 to 6, an embodiment of a battery charging and swapping system 100 according to the disclosure is adapted to be operably coupled to a control system (not shown), is adapted for charging and storing a plurality of batteries 902, and is adapted for swapping a battery 902 that is mounted to an electric vehicle 900 for one of the batteries 902 that is stored in the battery charging and swapping system 100. Specifically, the battery charging and swapping system 100 is controlled by the control system to remove a battery 902 that is mounted to the electric vehicle 900, and then to store and charge the battery 902. In this embodiment, the electric vehicle 900 is configured to be an electric car that includes a battery seat 901 and two guiding bars 903. The battery seat 901 is mounted to a bottom part of the electric vehicle 900, and has two opening ends in a left-right direction (L) perpendicular to an advancing direction (A) of the electric vehicle 900 so that each one of the batteries 902 is operable to be mounted to and be removed from the electric vehicle 900 through movements in the left-right direction (L). The guiding bars 903 are spaced apart from each other in a front-rear direction (F) opposite to the advancing direction (A) of the electric vehicle 900, and parallelly extend in the left-right direction (L). However, the electric vehicle 900 is not limited to an electric car and may be another type of electric vehicle. Furthermore, to assist in describing the disclosure based on the orientation of the embodiment shown in the illustrations, the advancing direction (A) of the electric vehicle 900 is defined to be opposite to the front-rear direction (F) of the embodiment (i.e., a left side of the electric vehicle 900 is a right side of the embodiment, and vice versa). The use of these directional definitions should not be interpreted to limit the disclosure in any way.

The battery charging and swapping system 100 includes a plurality of charging seats 2 (see FIG. 6), a battery swapping subsystem 3 and a battery charging subsystem 4. Each of the charging seats 2 is adapted for carrying a battery 902, and is adapted for being electrically coupled to the battery 902 to charge the battery 902. The charging seats 2 are movably stored in the battery charging subsystem 4. Each of the charging seats 2 is operable to be moved out from the battery charging subsystem 4 to be carried and conveyed by the battery swapping subsystem 3, and includes a seat body 21, a power receiving unit 22 and a charging control unit 23. For each charging seat 2, the seat body 21 is adapted for carrying a battery 902, and is adapted for being electrically coupled to the battery 902 to charge the battery 902. The power receiving unit 22 is mounted to the seat body 21 and receives electrical energy. For each charging seat 2, the charging control unit 23 is mounted to the seat body 21, is electrically coupled to the power receiving unit 22, is adapted to be electrically coupled to the battery 902, and is adapted to supply the battery 902 with the electrical energy received by the power receiving unit 22 to charge the battery 902. There will be no further details describing the charging control unit 23 since a charging control unit that is operable to charge a battery is widely-understood by those skilled in the art.

Figure 2:
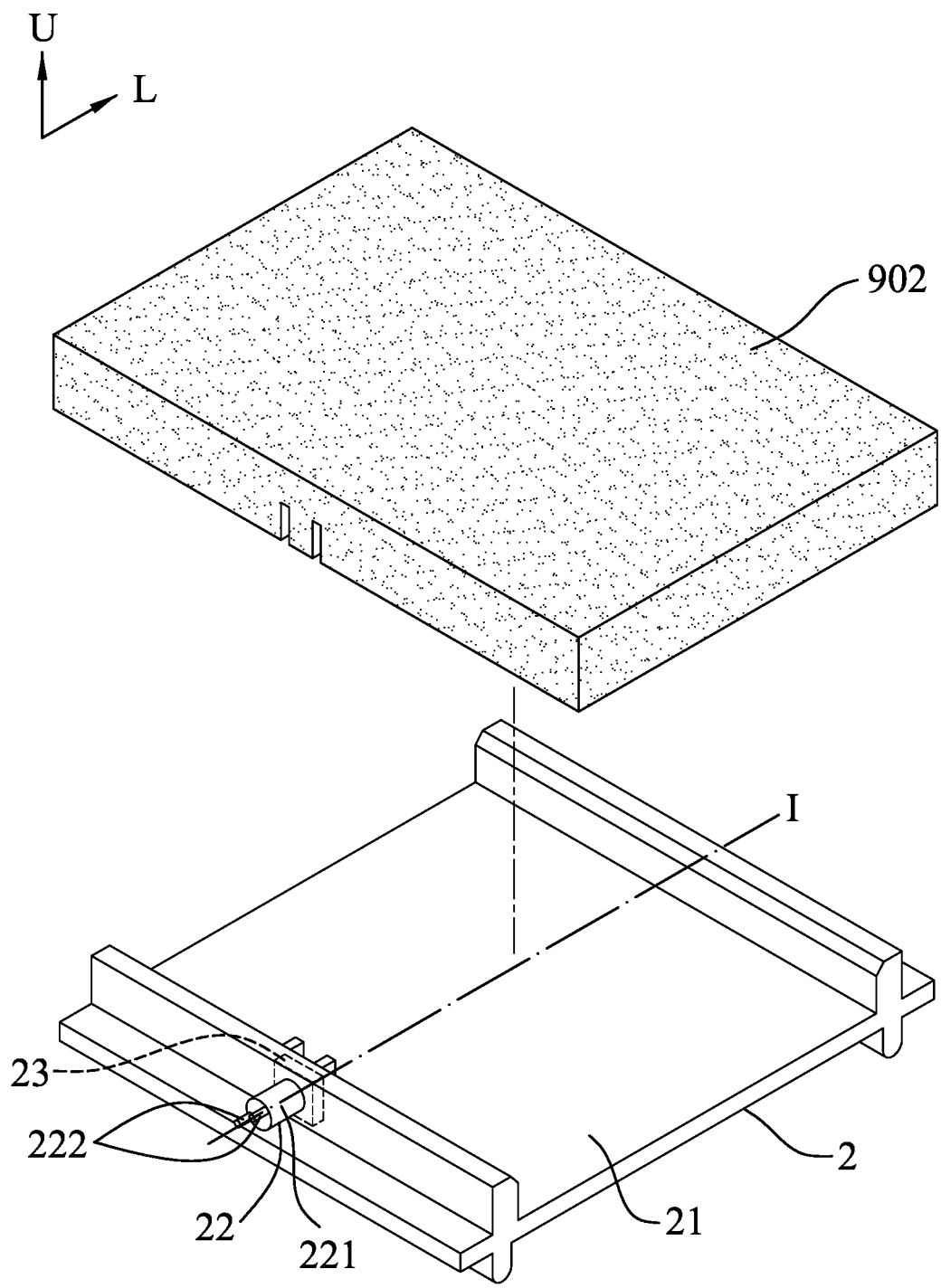
FIG. 2 is a perspective view of one of charging seats of the embodiment and a battery.
Figure 17:
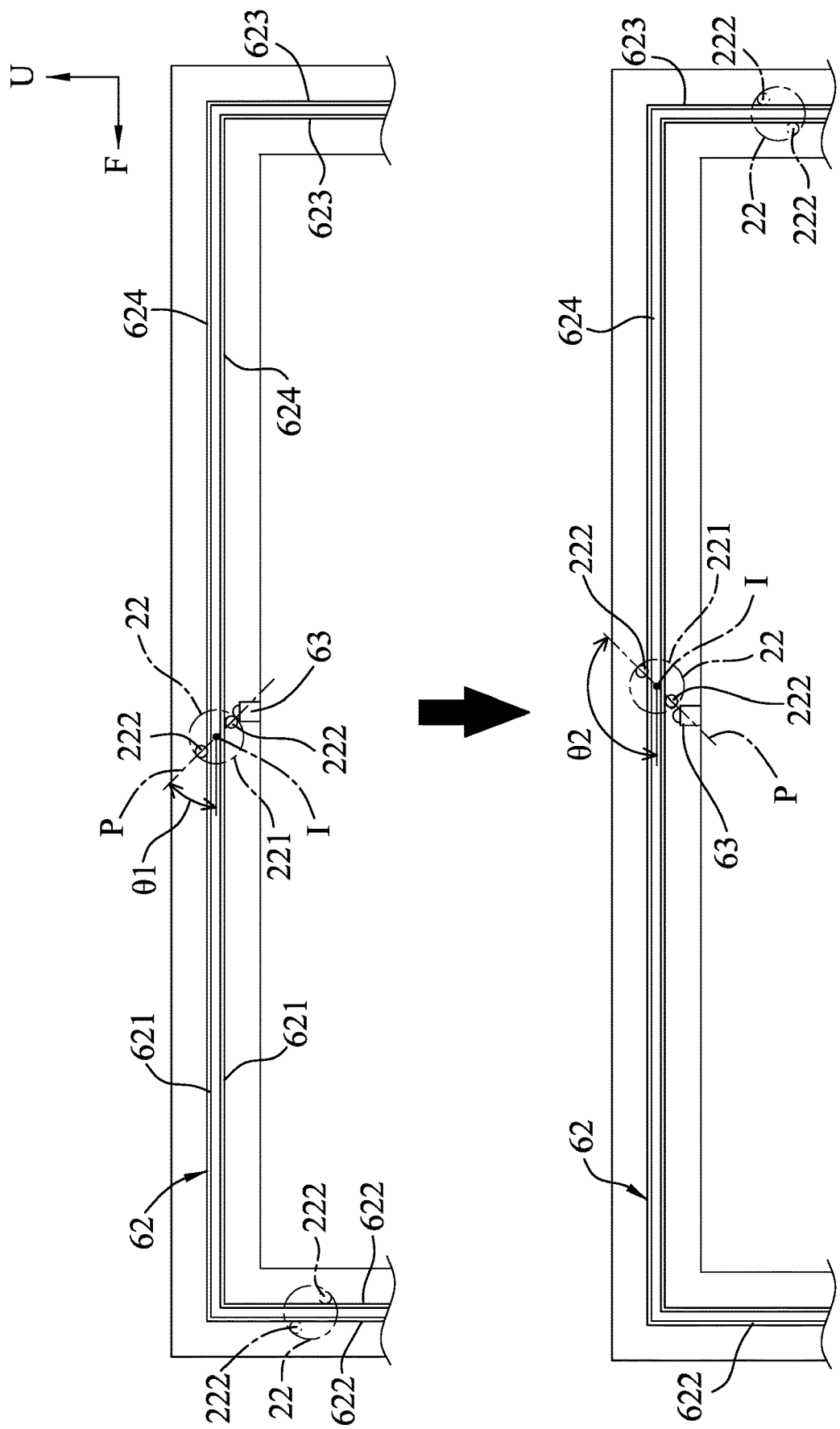
FIG. 17 illustrates conductive members of the embodiment converted from a first tilting state into a second tilting state by one of first blocking subunits of the embodiment.
Figure 18:
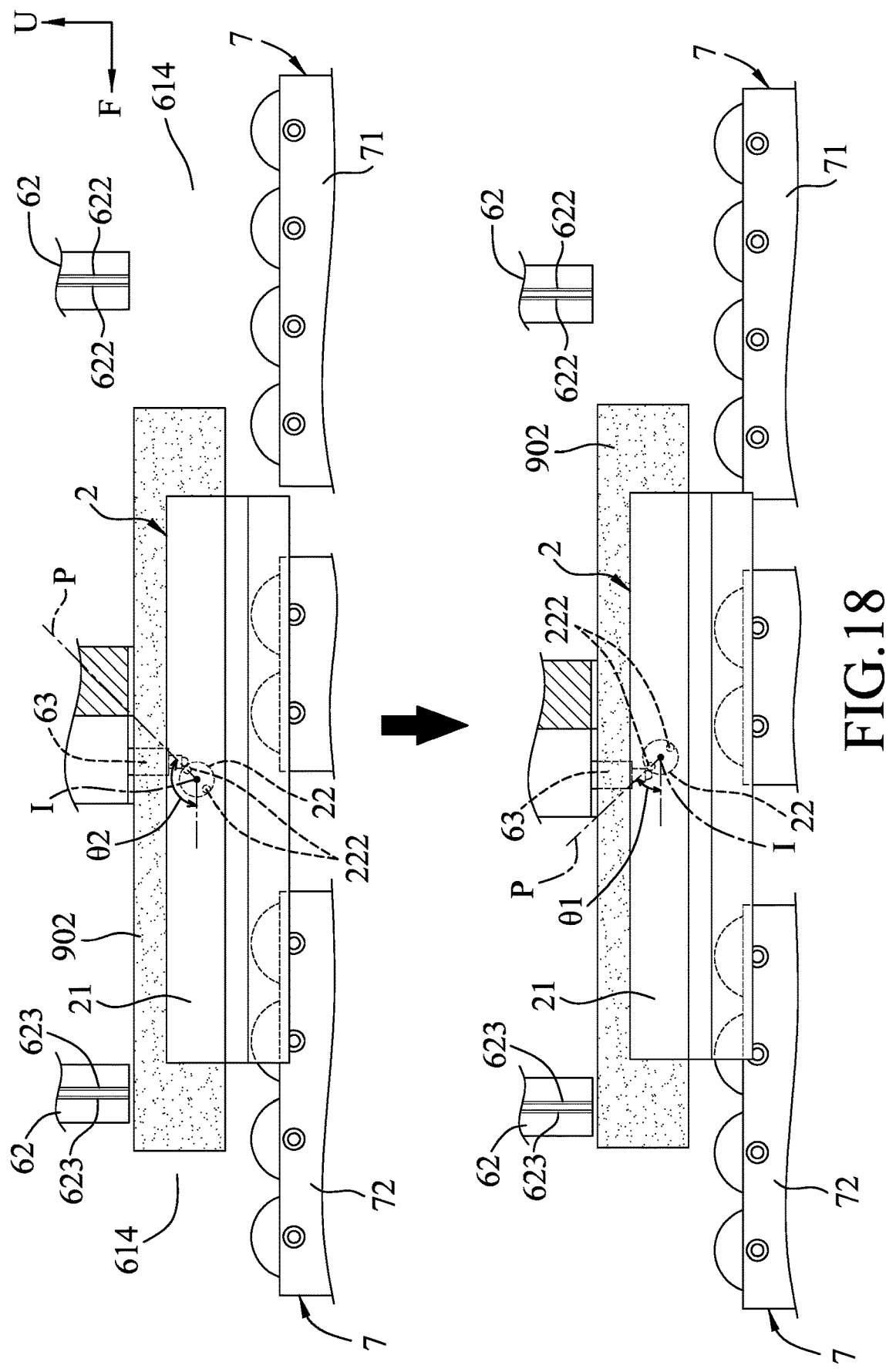
FIG. 18 illustrates the conductive members converted from the second tilting state into the first tilting state by the other one of the first blocking subunits.

Referring further to FIGS. 17 and 18, while also referring to FIG. 2, the power receiving unit 22 of each of the charging seats 2 includes a shaft 221 and two conductive members 222. The shaft 221 is mounted to the seat body 21, and is rotatable relative to the seat body 21 about an imaginary axis (I) that extends in the left-right direction (L). The conductive members 222 are mounted to the shaft 221, and are diametrically opposite to each other with respect to the imaginary axis (I). Via the rotation of the shaft 221, the conductive members 222 are convertible between a first tilting state, in which the conductive members 222 cooperate with the imaginary axis (I) to define an imaginary plane (P) that is tilted at a first angle (θ1) with respect to a reference horizontal surface (not shown), and a second tilting state, in which the imaginary plane (P) is tilted at a second angle (θ2) with respect to the reference horizontal surface. In this embodiment, when the conductive members 222 are in the first tilting state, one of the conductive members 222 that is in front of the other one of the conductive members 222 is higher than the other one of the conductive members 222 in an up-down direction (U) perpendicular to the left-right direction (L) and the front-rear direction (F), and the first angle (θ1) is configured to be 45 degrees. In addition, in this embodiment, when converted from the first tilting state to the second tilting state, the shaft 221 is rotated 90 degrees in a clockwise direction as shown in FIG. 17 so that the second angle (θ2) is configured to be 135 degrees.

Figure 3:
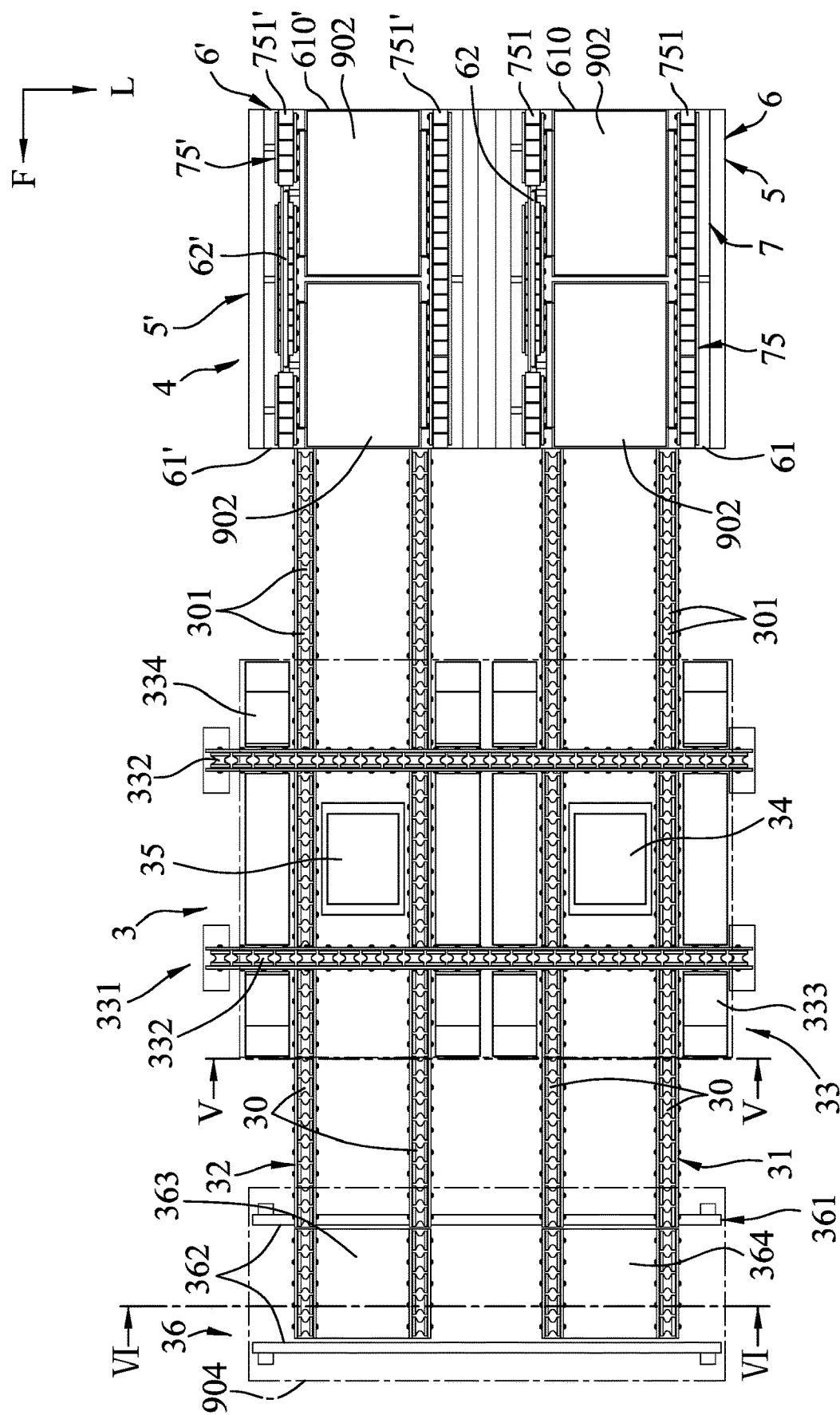
FIG. 3 is a top view of the embodiment.
Figure 4:
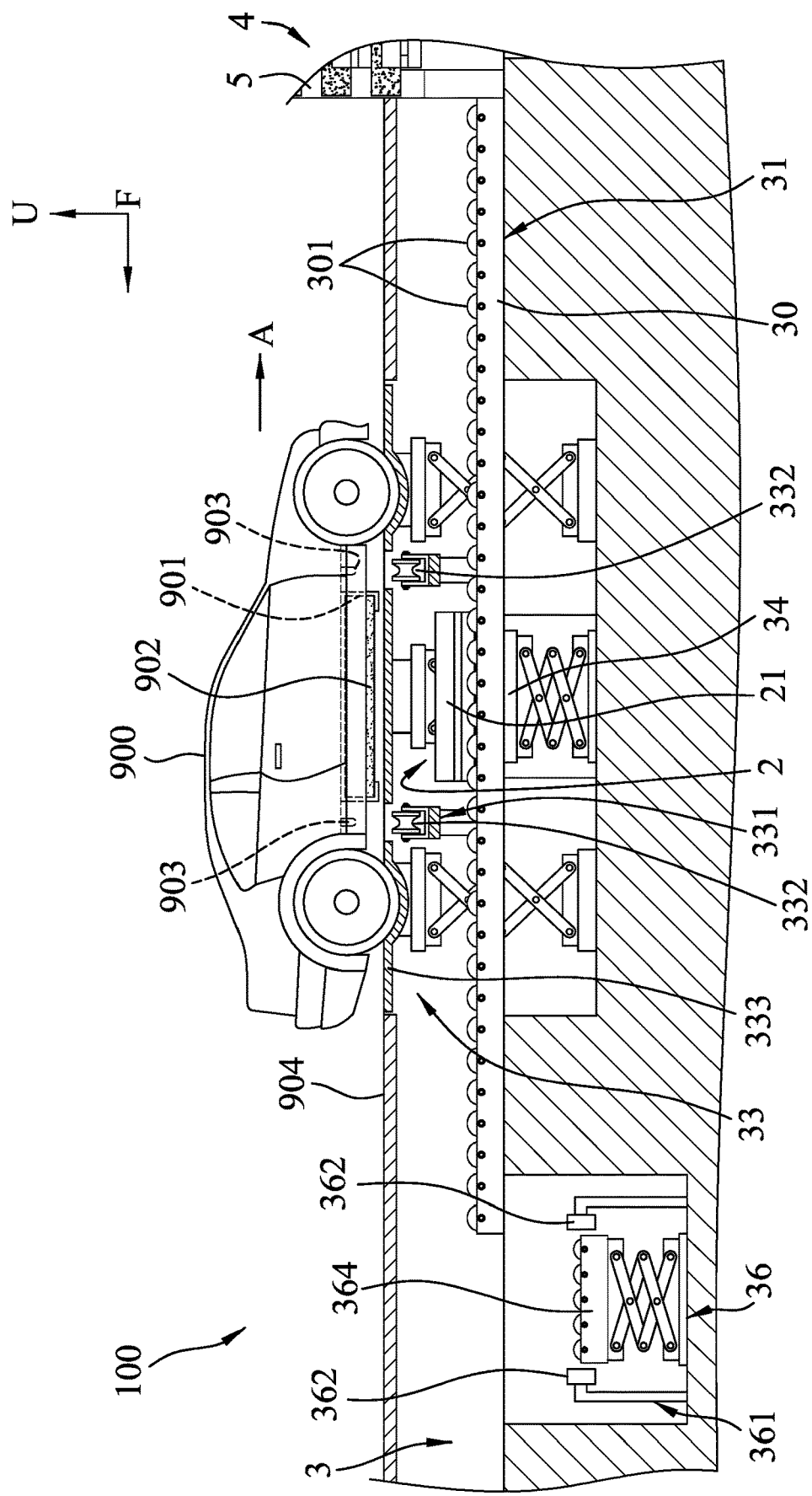
FIG. 4 is a fragmentary sectional view illustrating the embodiment carrying an electric vehicle.
Figure 5:
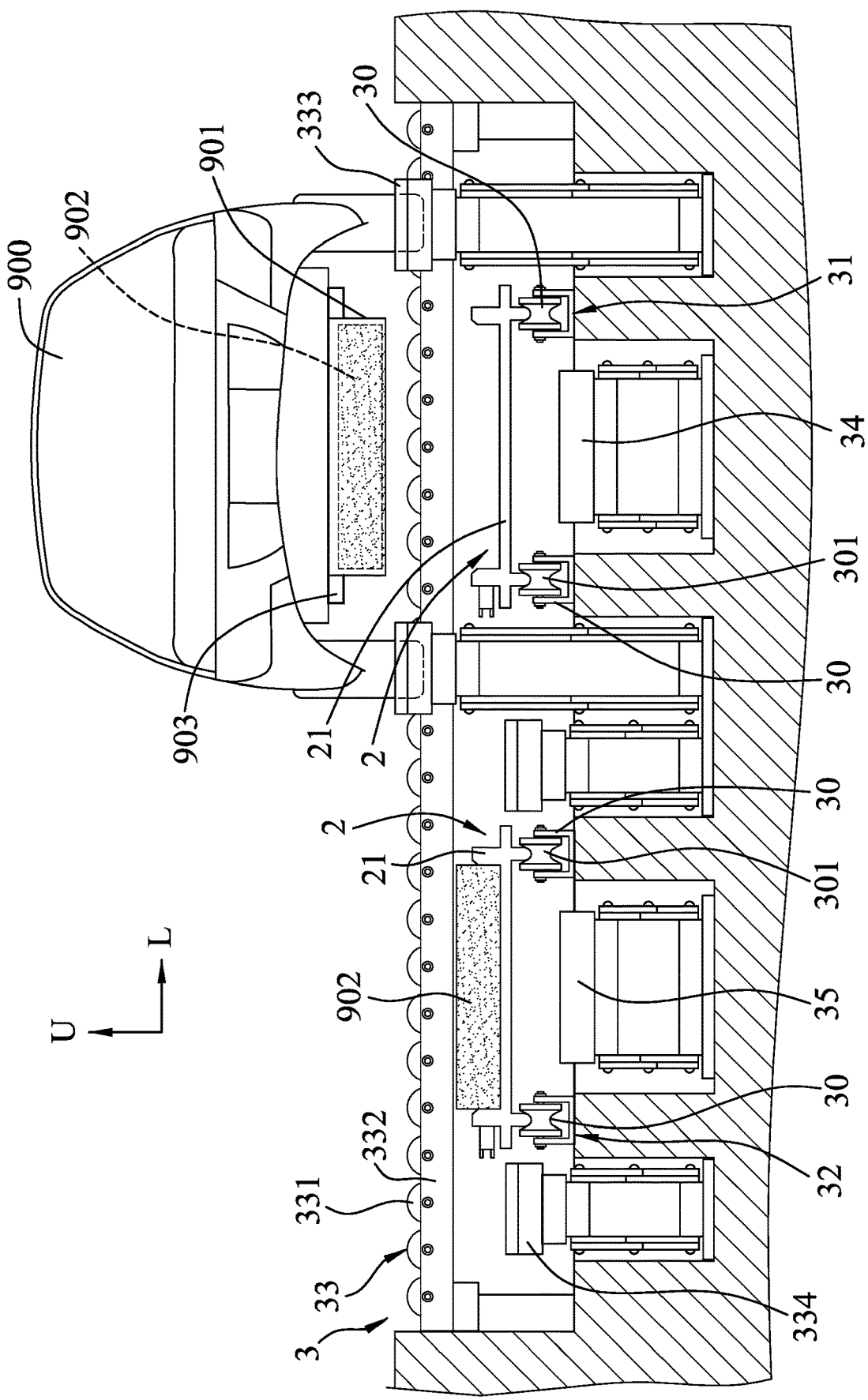
FIG. 5 is a fragmentary sectional view taken along line V-V of FIG. 3, illustrating the embodiment carrying the electric vehicle.

Referring further to FIG. 3, in cooperation with FIGS. 1 and 4, the battery swapping subsystem 3 is disposed at the front of the battery charging subsystem 4, is adapted to be mounted below the ground 904, and includes a first moving unit 31, a second moving unit 32, a vehicle conveying unit 33, a battery removing unit 34, a battery mounting unit 35 and a shifting unit 36. The first moving unit 31 and the second moving unit 32 are spaced apart from each other in the left-right direction (L), extend in the front-rear direction (F), and respectively define a first swapping path and a second swapping path. The vehicle conveying unit 33 defines a vehicle conveying path. The battery removing unit 34 and the battery mounting unit 35 are respectively disposed on the first swapping path and the second swapping path. Specifically, in this embodiment, the battery removing unit 34 and the battery mounting unit 35 are respectively disposed at an intersection of the first swapping path and the vehicle conveying path, and an intersection of the second swapping path and the vehicle conveying path. The shifting unit 36 is disposed at a front end of the first moving unit 31 and a front end of the second moving unit 32, and extends in the left-right direction (L).

The first moving unit 31 is operable to carry and rearwardly convey the charging seats 2 along the first swapping path so that the charging seats 2 can enter the battery charging subsystem 4 and be stored. The second moving unit 32 is operable to carry and forwardly convey the charging seats 2 that are moved out from the battery charging subsystem 4 along the second swapping path. In this embodiment, each of the first moving unit 31 and the second moving unit is configured to be a roller conveyor, and includes two seat moving rails 30 that are spaced apart from each other in the left-right direction (L), and that extend in the front-rear direction (F). Each of the seat moving rails 30 consists of a plurality of rollers 301 that are arranged in the front-rear direction (F). Each of the rollers 301 extends in the left-right direction (L) and is rotatable about a central axis (not shown) thereof that extends in the left-right direction (L). For each of the first moving unit 31 and the second moving unit 32, the seat moving rails 30 cooperate with each other to carry the seat body 21 (see FIG. 5) of one of the charging seats 2 thereon, and the rollers 301 of each of the seat moving rails 30 are operable to rotate so as to cooperatively convey the one of the charging seats 2 thereon in the front-rear direction (F). However, in certain embodiments, each of the first moving unit 31 and the second moving unit 32 may be configured to be, but not limited to, a belt conveyor (i.e., each of the seat moving rails 30 may be configured to be, but not limited to, a conveyor belt).

The vehicle conveying unit 33 includes a vehicle conveying subunit 331, a first vehicle carrying subunit 333, and a second vehicle carrying subunit 334 that is spaced apart from the first vehicle carrying subunit 333 in the left-right direction (L). The vehicle conveying subunit 331 is adapted to carry and convey the electric vehicle 900, is located over the first moving unit 31 and the second moving unit 32, extends across the first moving unit 31 and the second moving unit 32 in the left-right direction (L), defines the vehicle conveying path, and includes two vehicle conveying rails 332 that are parallelly spaced apart from each other in the front-rear direction (F). Each of the vehicle conveying rails 332 extends in the left-right direction (L).

Figure 13:
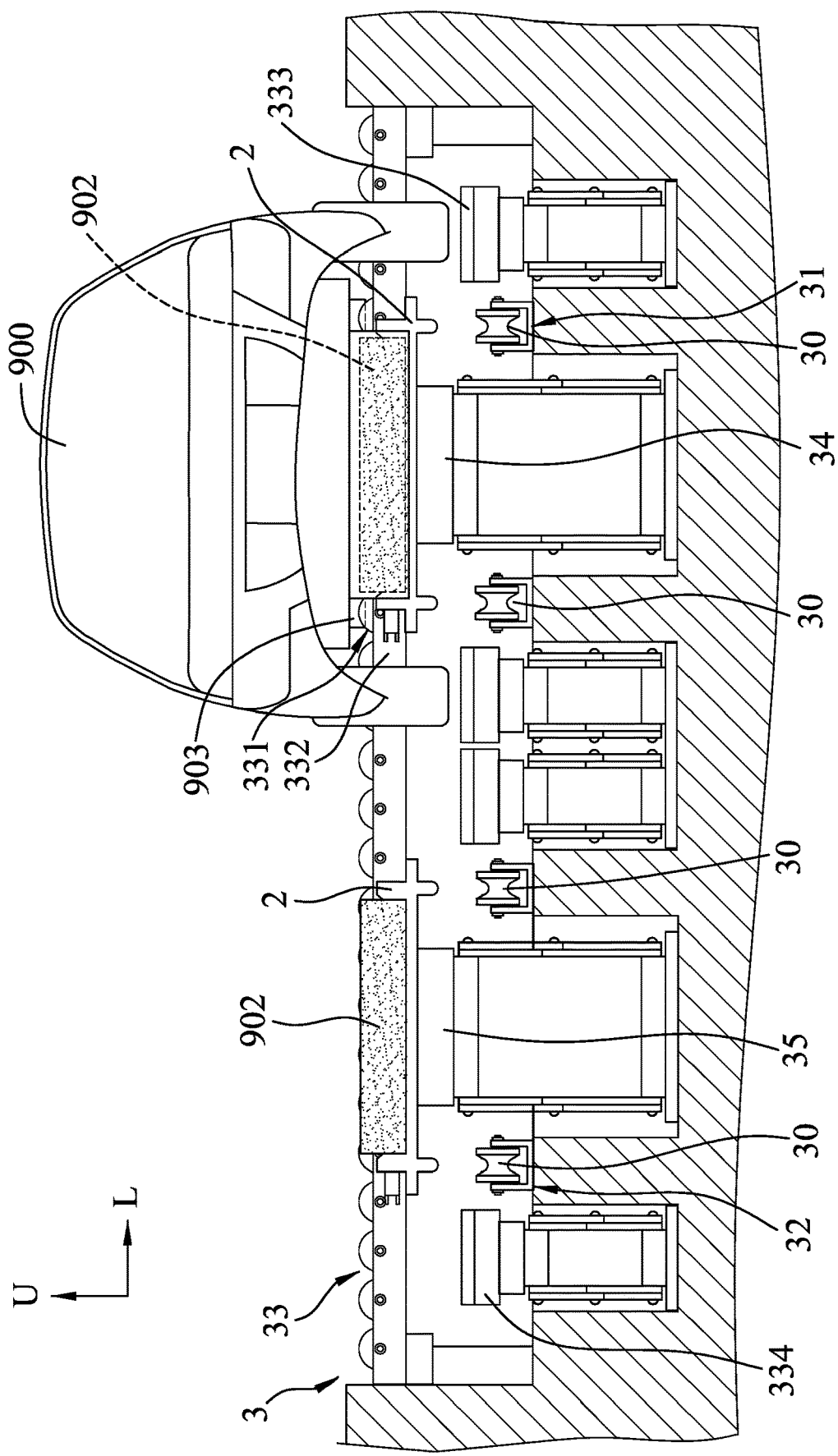
FIG. 13 is a fragmentary sectional view illustrating a vehicle conveying subunit carrying the electric vehicle that is mounted with a battery, and illustrating a battery removing unit of the embodiment connecting one of the charging seats to the battery that is mounted to the electric vehicle.
Figure 14:
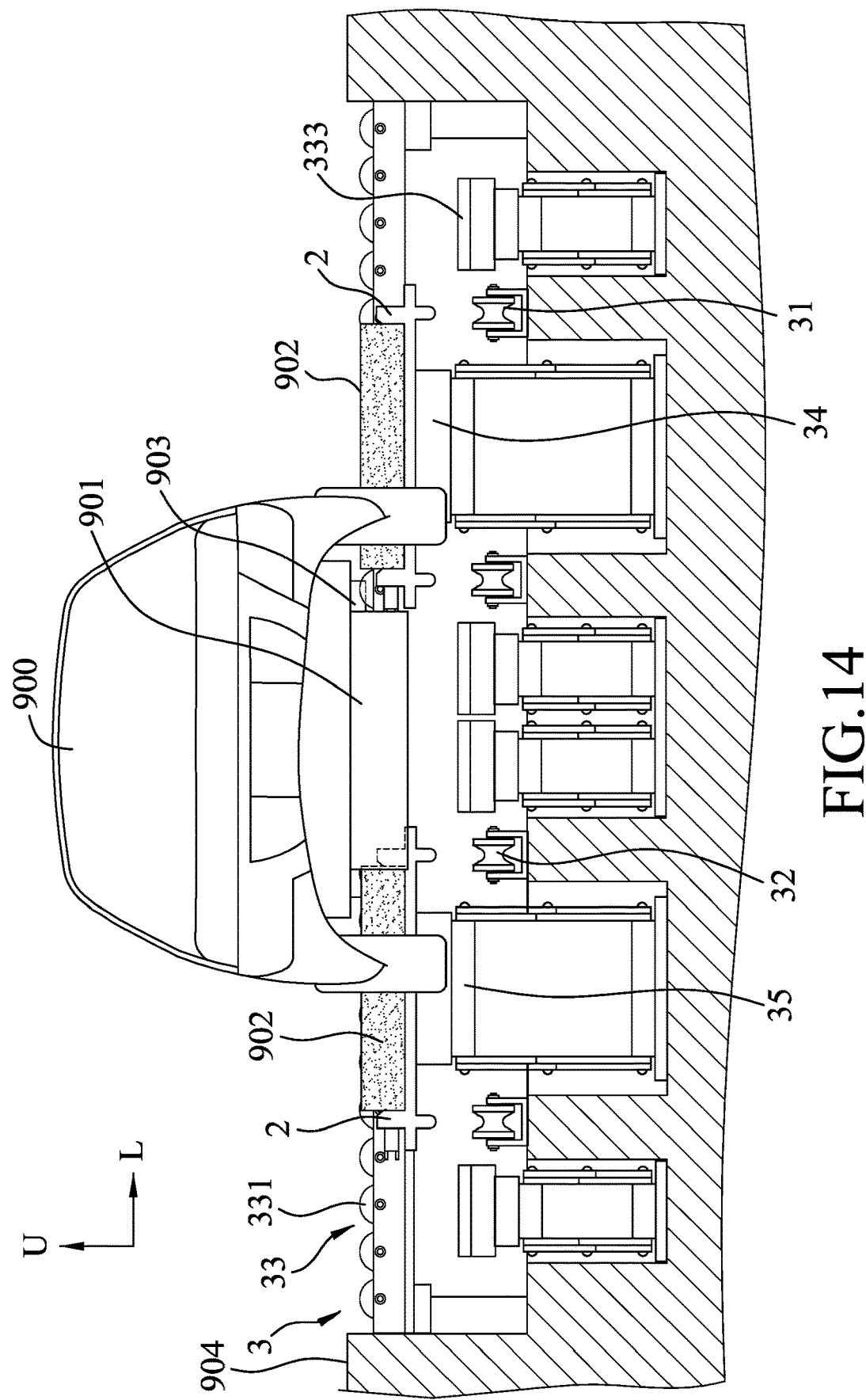
FIG. 14 is a fragmentary sectional view illustrating the vehicle conveying subunit conveying the electric vehicle toward a battery mounting unit of the embodiment.
Figure 15:
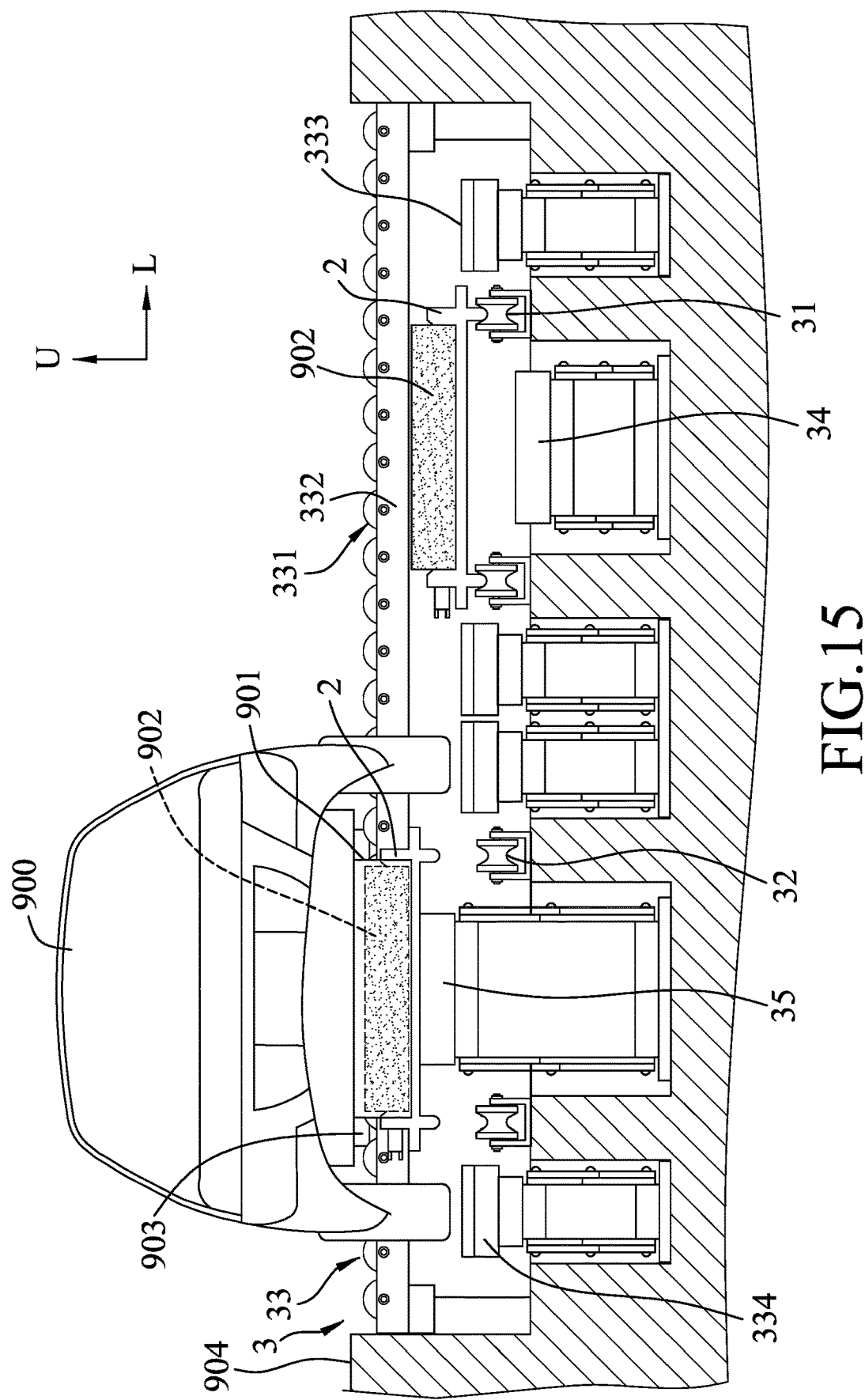
FIG. 15 is a fragmentary sectional view illustrating the electric vehicle mounted with a battery that is carried by the battery mounting unit.
Figure 16:
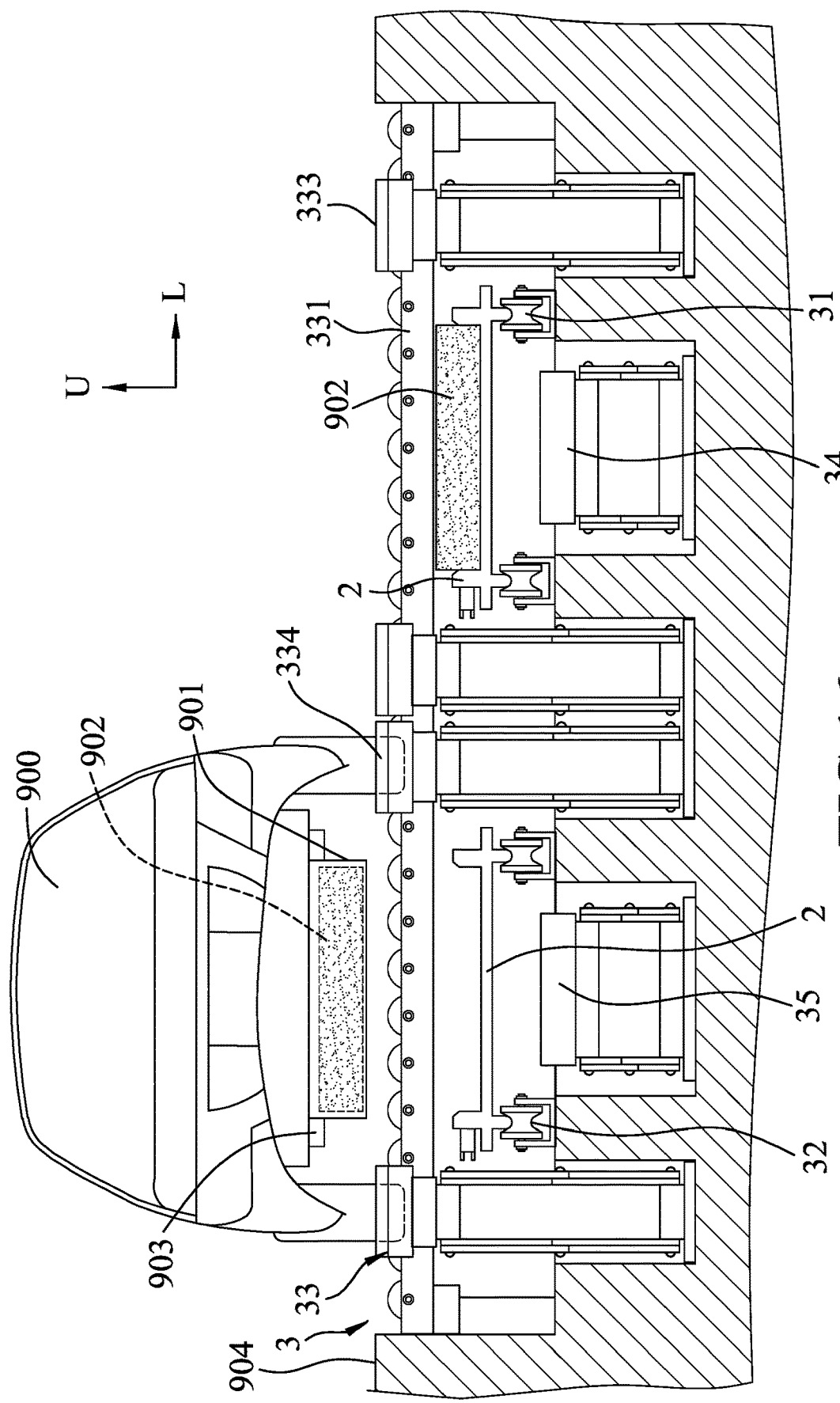
FIG. 16 is a fragmentary sectional view illustrating the electric vehicle separated from the vehicle conveying subunit.

Each of the first vehicle carrying subunit 333 and the second vehicle carrying subunit 334 is adapted to carry the electric vehicle 900, and extends across the vehicle conveying rails 332 of the vehicle conveying subunit 331 in the front-rear direction (F). The first vehicle carrying subunit 333 is disposed at the first swapping path of the first moving unit 31, and is operable to convert between a retracted state, in which the first vehicle carrying subunit 333 is retracted so that a top end thereof is located above the first moving unit 31 and below the ground 904, and an extended state, in which the first vehicle carrying subunit 333 is extended so that the top end thereof and the ground 904 are located at the same height. The second vehicle carrying subunit 334 is disposed at the second swapping path of the second moving unit 32, and is operable to convert between a retracted state, in which the second vehicle carrying subunit 334 is retracted so that a top end thereof is located above the second moving unit 32 and below the ground 904, and an extended state, in which the second vehicle carrying subunit 334 is extended so that the top end thereof and the ground 904 are located at the same height. When the first vehicle carrying subunit 333 is in the extended state (see FIG. 4), the electric vehicle 900 that is located at one side of the battery swapping subsystem 3 opposite to the battery charging subsystem 4 may smoothly advance along the first swapping path of the first moving unit 31 in the advancing direction (A) from the ground 904 to the top end of the first vehicle carrying subunit 333 so that the first vehicle carrying subunit 333 carries the electric vehicle 900. Then, when the first vehicle carrying subunit 333 carries the electric vehicle 900, the first vehicle carrying subunit 333 is operable to convert into the retracted state so that the electric vehicle 900 is conveyed downwardly onto the vehicle conveying subunit 331 (see FIG. 13). At this time, the electric vehicle 900 is separated from the first vehicle carrying subunit 333 and is carried by the vehicle conveying subunit 331. Specifically, the vehicle conveying rails 332 of the vehicle conveying subunit 331 respectively abut against the guiding bars 903 of the electric vehicle 900 (only one of the vehicle conveying rails 332 and one of the guiding bars 903 are visible due to the viewing angle in FIG. 13) to carry the electric vehicle 900. The vehicle conveying subunit 331 is operable to convey the electric vehicle 900 along the vehicle conveying path to the second swapping path of the second moving unit (see FIGS. 14 and 15) so that the electric vehicle 900 is located over the second moving unit 32 and the second vehicle carrying subunit 334. Then, the second vehicle carrying subunit 334 is operable to convert into the extended state to carry and to upwardly convey the electric vehicle 900 (see FIG. 16) so that the electric vehicle 900 is separated from the vehicle conveying subunit 331 and may smoothly reverse to the ground 904 when the top end of the second vehicle carrying subunit 334 and the ground 904 are located at the same height. It is noted that, instead of converting between the retracted state and the extended state, each of the first vehicle carrying subunit 333 and the second vehicle carrying subunit 334 may be connected to a telescopic device to achieve the abovementioned effects. There will be no further details describing the first vehicle carrying subunit 333 and the second vehicle carrying subunit 334 since a vehicle carrying subunit that is operable to carry and to convey a car in up-down movements is widely-understood by those skilled in the art and may have various configurations.

The battery removing unit 34 is operable to move relative to the first moving unit 31 in the up-down direction (U). When the electric vehicle 900 that is mounted with a battery 902 is carried by the vehicle conveying subunit 331 of the vehicle conveying unit 33 and is located over the battery removing unit 34 (i.e., the bottom part of the electric vehicle 900 is located over the first moving unit 31), and when one of the charging seats 2 is carried by the first moving unit 31 (see FIG. 13), the battery removing unit 34 is operable to move upwardly to push the one of the charging seats 2 carried by the first moving unit 31 upwardly such that the battery 902 mounted on the electric vehicle 900 is connected to and is carried by the one of the charging seats 2. When the one of the charging seats 2 is connected to the battery 902 that is mounted to the electric vehicle 900 and when the vehicle conveying subunit 331 conveys the electric vehicle 900 away from the battery removing unit 34 along the vehicle conveying path, the battery removing unit 34 is operable to urge the battery 902 to be removed from the electric vehicle 900. Specifically, in this embodiment, the one of the charging seats 2 that is connected to the battery 902 is carried by the battery removing unit 34 so that when the electric vehicle 900 is conveyed in the vehicle conveying path toward the second moving unit 32 (see FIG. 14), the battery 902 is removed from the electric vehicle 900 by a relative movement between the battery 902 and the electric vehicle 900 in the left-right direction (L). When the battery 902 is connected to and carried by the one of the charging seats 2, the battery removing unit 34 is operated to convey the one of the charging seats 2 downwardly such that the one of the charging seats 2 is carried by the first moving unit 31 and is separated from the battery removing unit 34 (see FIG. 15). At this time, the first moving unit 31 is operable to rearwardly convey the one of the charging seats 2 that is connected to the battery 902 along the first swapping path toward the battery charging subsystem 4.

The battery mounting unit 35 is operable to move relative to the second moving unit 32 in the up-down direction (U). When one of the charging seats 2 that carries a charged battery 902 is carried by the second moving unit 32 and is located over the battery mounting unit 35, the battery mounting unit 35 is operated to move upwardly to push the one of the charging seats 2 upwardly so that the one of the charging seats 2 is on the vehicle conveying path. Then, when the one of the charging seats 2 that carries the charged battery 902 is pushed upwardly by the battery mounting unit 35 and is located on the vehicle conveying path (see FIG. 14), the vehicle conveying subunit 331 of the vehicle conveying unit 33 is operated to convey the electric vehicle 900, whose battery 902 has been removed according to the aforesaid description, toward the battery mounting unit 35 such that the battery mounting unit 35 is operable to urge the battery 902 that is carried by the one of the charging seats 2 to be mounted to the electric vehicle 900. When the battery 902 that is carried by the one of the charging seats 2 is mounted to the electric vehicle 900, the battery mounting unit 35 is operated to move downwardly such that the battery 902 and the one of the charging seats 2 are separated, and is operated to place the one of the charging seats 2 that is separated from the battery 902 on the second moving unit 32 (see FIG. 16) so that the second moving unit 32 carries and is operable to forwardly convey the one of the charging seats 2 along the second swapping path to the shifting unit 36.

Figure 6:
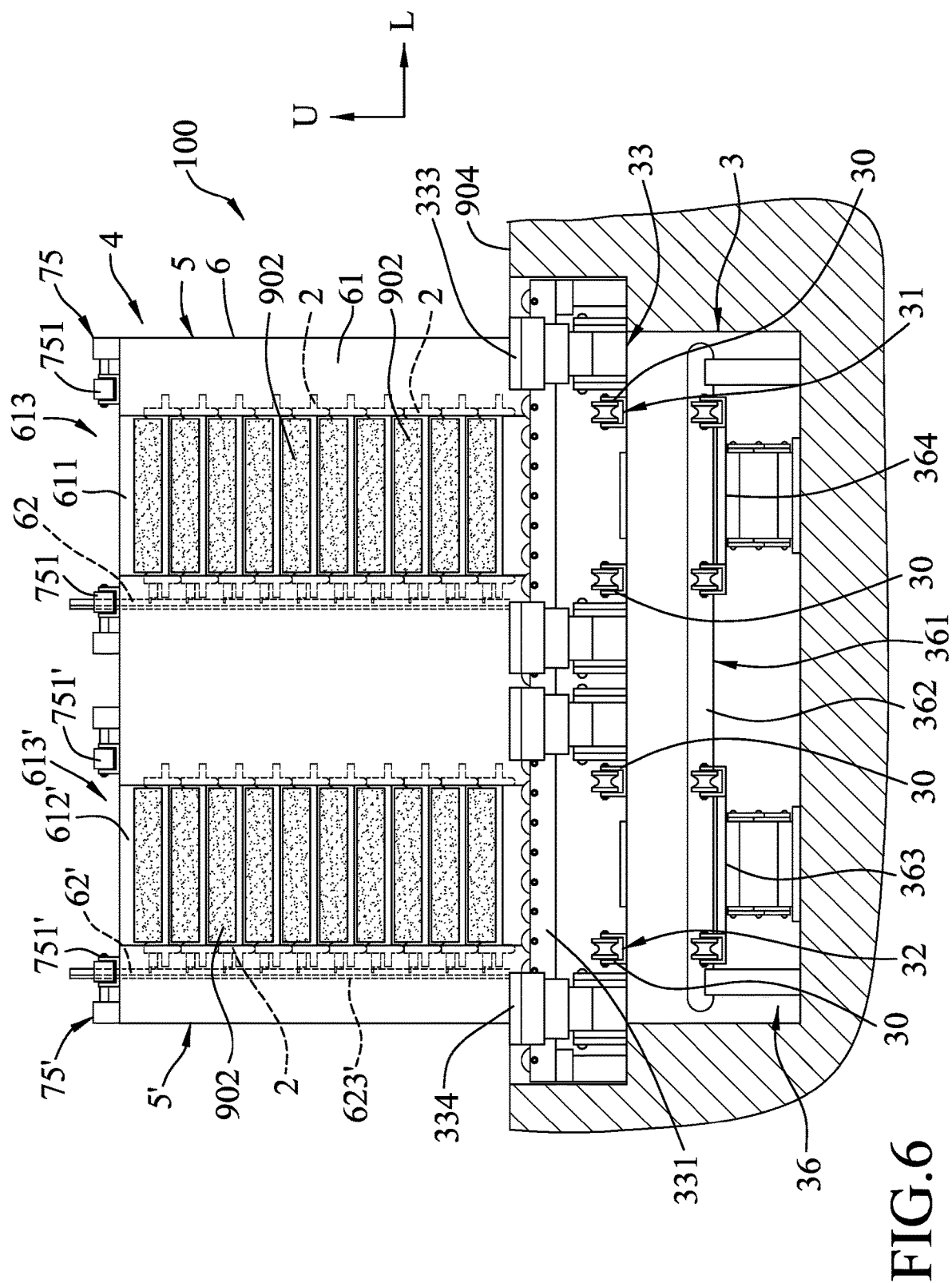
FIG. 6 is a fragmentary sectional view taken along line VI-VI of FIG. 3, illustrating a shifting unit of the embodiment.
Figure 7:
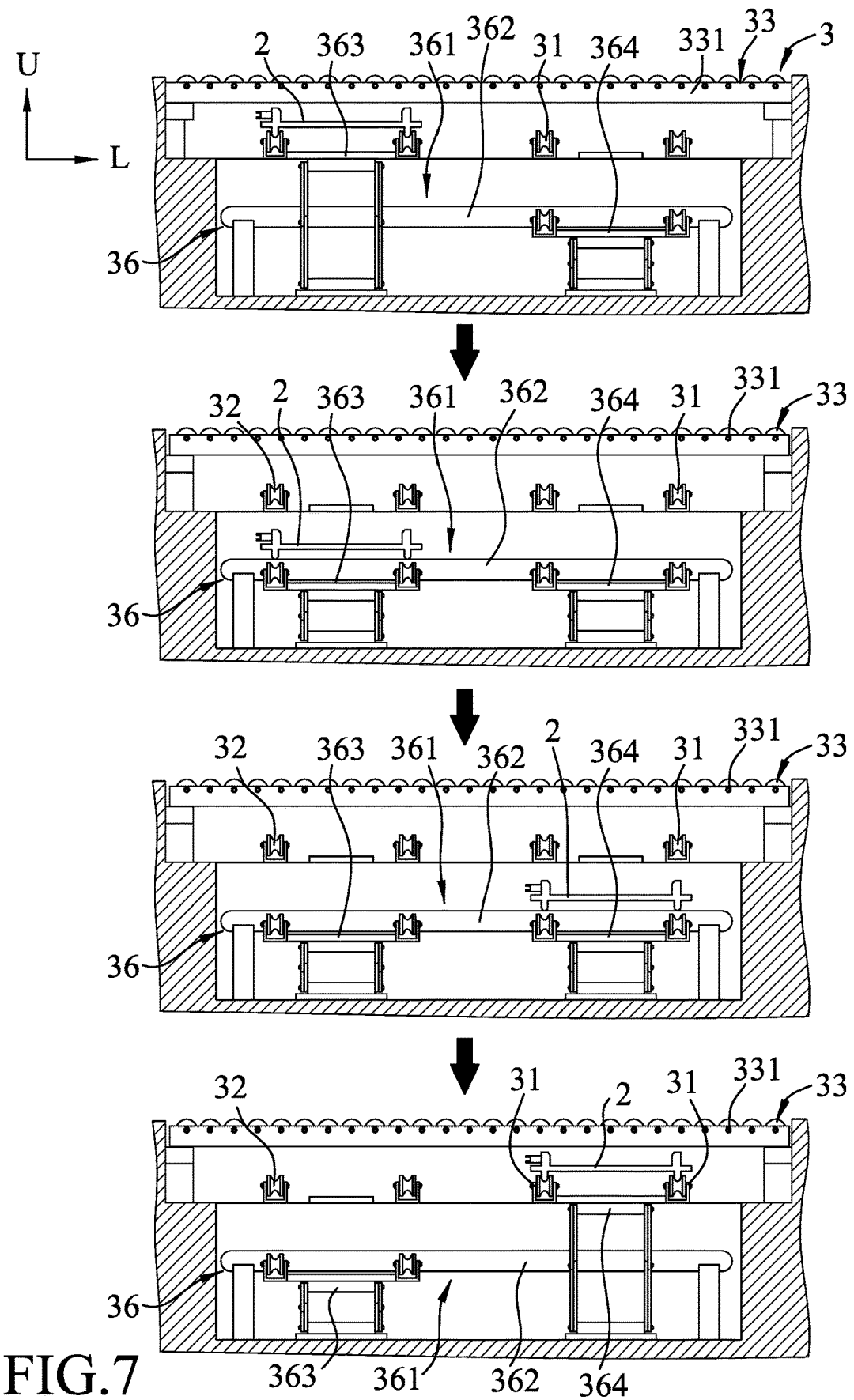
FIG. 7 illustrates the shifting unit conveying one of the charging seats to a first moving unit of the embodiment from a second moving unit of the embodiment.

Further referring to FIG. 7, in cooperation with FIGS. 3 and 6, the shifting unit 36 includes a seat shifting subunit 361, a first seat lifting subunit 363 and a second seat lifting subunit 364. The seat shifting subunit 361 extends from the front end of the first moving unit 31 to the front end of the second moving unit 32 in the left-right direction (L), is located below the first moving unit 31 and the second moving unit 32, and includes two seat shifting rails 362 that are spaced apart from each other in the front-rear direction (F), and that extend in the left-right direction (L). The first seat lifting subunit 363 and the second seat lifting subunit 364 are respectively disposed at two opposite portions of the seat shifting subunit 361 in the left-right direction (L), and respectively correspond in position to the second swapping path and the first swapping path in the front-rear direction (F). The first seat lifting subunit 363 is operable to convert between a retracted state, in which the first seat lifting subunit 363 is retracted so that a top end thereof is located below the seat shifting rails 362 (only one of the seat shifting rails 362 is visible due to the viewing angle in each of FIGS. 6 and 7), and an extended state, in which the first seat lifting subunit 363 is extended so that the top end thereof and the second moving unit 32 are located at the same height (i.e., the top end of the first seat lifting subunit 363 is located above the seat shifting rails 362). The second seat lifting subunit 364 is operable to convert between a retracted state, in which the second seat lifting subunit 364 is retracted so that a top end thereof is located below the seat shifting rails 362, and an extended state, in which the second seat lifting subunit 364 is extended so that the top end thereof and the first moving unit 31 are located at the same height (i.e., the top end of the second seat lifting subunit 364 is located above the seat shifting rails 362). When the one of the charging seats 2 that is separated from a battery 902 is conveyed forwardly along the second swapping path by the second moving unit 32 to the shifting unit 36, the first seat lifting subunit 363 is operated to be in the extended state to carry the one of the charging seats 2 that is separated from the battery 902 from the second moving unit 32. Then, the first seat lifting subunit 363 is operated to convert into the retracted state to convey the one of the charging seats 2 downwardly to the seat shifting subunit 361. At this time, the one of the charging seats 2 is separated from the first seat lifting subunit 363 and is carried by the seat shifting subunit 361. Next, by virtue of the seat shifting rails 362, the seat shifting subunit 361 is operated to convey the one of the charging seats 2 in the left-right direction (L) to the second seat lifting subunit 364. At this time, the second seat lifting subunit 364 is in the retracted state, and the one of the charging seats 2 is located above the second seat lifting subunit 364. Then, the second seat lifting subunit 364 is operated to convert into the extended state so as to carry and to convey the one of the charging seats 2 upwardly. When the top end of the second seat lifting subunit 364 and the first moving unit 31 are located at the same height, the second seat lifting subunit 364 is operated to convey the one of the charging seats 2 rearwardly to the first moving unit 31 such that the first moving unit 31 is operable to convey the one of the charging seats 2 to the battery removing unit 34. When the one of the charging seats 2 that is separated from the battery 902 is conveyed by the first moving unit 31 and is located above the battery removing unit 34, and when another electric vehicle that has a structure similar to, or the same as the electric vehicle 900, and that is mounted with another one of the batteries 902 is located over the battery removing unit 34, the battery removing unit 34 is operated to move upwardly to push the one of the charging seats 2 upwardly such that another battery 902 that is mounted to the another electric vehicle is connected to and is carried by the one of the charging seats 2, which is the same as the operation of the battery removing unit 34 mentioned previously. It is noted that, there will be no further details describing the seat shifting subunit 361 and the second seat lifting subunit 364 since in this embodiment, each of a conveying mechanism of the seat shifting subunit 361 that is for conveying the charging seats 2 in the left-right direction (L) and a conveying mechanism of the second seat lifting subunit 364 that is for conveying the charging seats in the front-rear direction (F) has a structure similar to those of the first moving unit 31 and the second moving unit 32 that are operable to convey the charging seats 2 in the front-rear direction (F).

Figure 8:
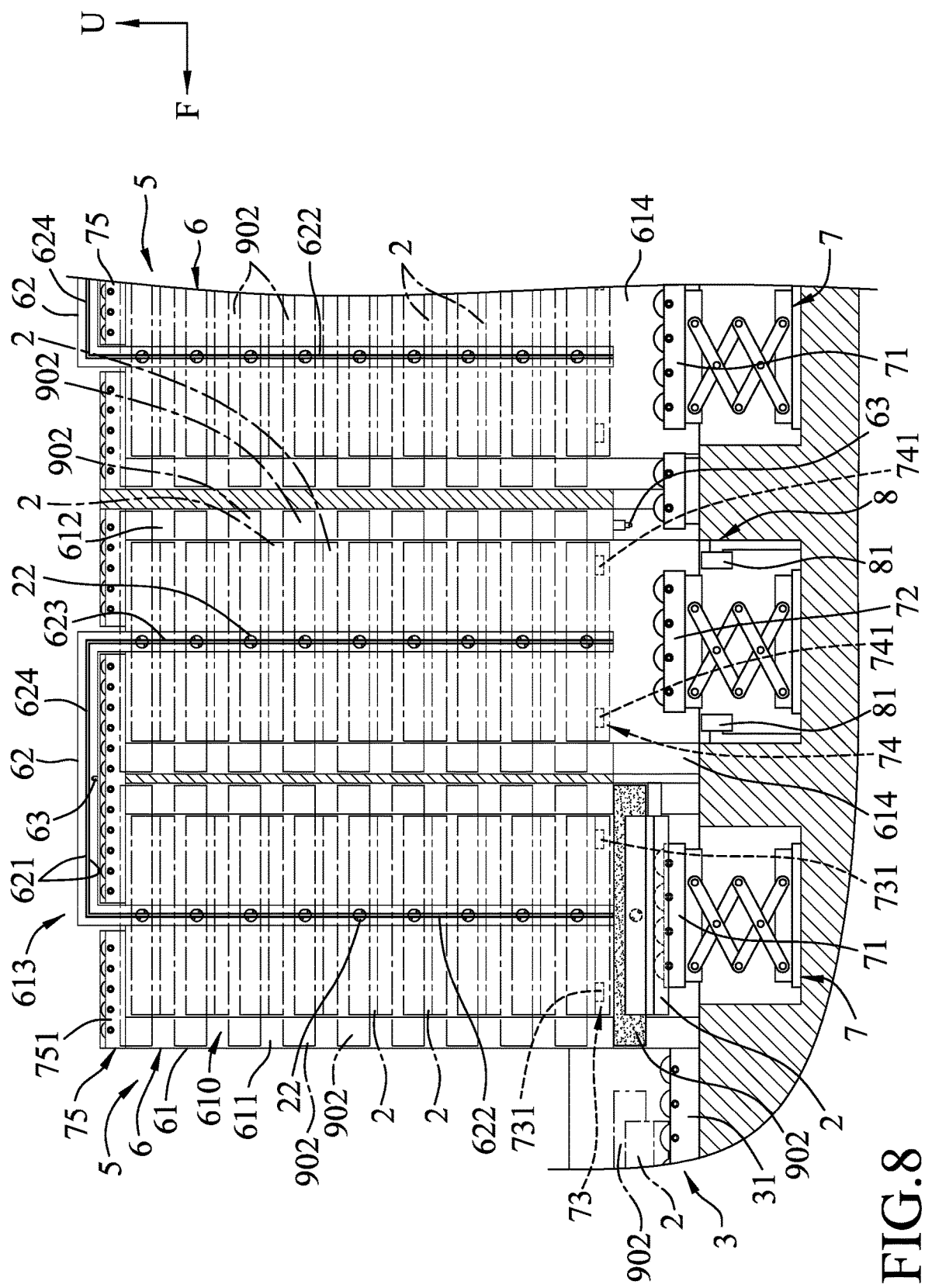
FIG. 8 is a fragmentary sectional view illustrating one of the charging seats conveyed to a battery charging subsystem of the embodiment.

Referring further to FIG. 8, in cooperation with FIGS. 1 and 6, the battery charging subsystem 4 includes a plurality of first battery charging apparatuses 5 that are arranged in the front-rear direction (F), a plurality of second battery charging apparatuses 5' (not shown in FIG. 8) that are arranged in the front-rear direction (F), and a plurality of lower conveying apparatuses 8 (only one is shown in FIG. 8).

Each of the first battery charging apparatuses 5 provides accommodation for the charging seats 2 that carry batteries 902, and conveys the charging seats 2 that carry the batteries 902. The first battery charging apparatuses 5 are located at a rear of the first swapping path in a manner that the first moving unit 31 of the battery swapping subsystem 3 is in front of and adjacent to a frontmost one of the first battery charging apparatuses 5 so that the charging seats 2 enter the frontmost one of the first battery charging apparatuses 5 when conveyed rearwardly by the first moving unit 31. Each of the second battery charging apparatuses 5' provides accommodation for the charging seats 2 that carry the batteries 902, and conveys the charging seats 2 that carry the batteries 902. The second battery charging apparatuses 5' and the first battery charging apparatuses 5 are arranged in the left-right direction. Specifically, in this embodiment, the second battery charging apparatuses 5' are located at a right side of the first battery charging apparatuses 5 (i.e., the first battery charging apparatuses 5 are located at a left side of the second battery charging apparatuses 5'). The second battery charging apparatuses 5' are located at a rear of the second swapping path in a manner that the second moving unit 32 of the battery swapping subsystem 3 is in front of and adjacent to a frontmost one of the second battery charging apparatuses 5' so that the charging seats 2 are carried and conveyed by the second moving unit 32 when moved out forwardly from the frontmost one of the second battery charging apparatuses 5'. Specifically, the charging seats 2 that carry the batteries 902 are rearwardly conveyed one by one by the first moving unit 31 to enter the frontmost one of the first battery charging apparatuses 5 so as to be stored in the battery charging subsystem 4, and are forwardly moved out from the battery charging subsystem 4 one by one by the frontmost one of the second battery charging apparatuses 5' so as to be carried and conveyed one by one by the second moving unit 32.

Each of the first battery charging apparatuses 5 includes a first battery charging unit 6 and a first conveying unit 7. The first battery charging unit 6 includes a first charging station 61, a first charging rail 62 and two first blocking subunits 63. The first charging station 61 defines a first conveying space 610. The charging seats 2 are operable to enter the first conveying space 610 so as to be stored. The first charging rail 62 is disposed at the first charging station 61, and is electrically coupled to the charging seats 2 to supply the electrical energy to the charging seats 2 (i.e., the power receiving units 22 of the charging seats 2 receive the electrical energy when electrically coupled to the first charging rail 62 so that the charging control units 23 of the charging seats 2 supply the batteries 902 with the electrical energy). The first blocking subunits 63 are disposed at the first charging station 61, are configured to be elastic, and are spaced apart from each other. The first conveying unit 7 is disposed at the first charging station 61 and is operable to carry and convey the charging seats 2 that enter the first conveying space 610.

For each first battery charging apparatus 5, the first conveying space 610 of the first battery charging unit 6 has a first upward conveying subspace 611, a first downward conveying subspace 612, a first upper communicating subspace 613 and a first lower communicating subspace 614. The first upward conveying subspace 611 and the first downward conveying subspace 612 are isolated from each other, are arranged in the front-rear direction (F), and extend in the up-down direction (U). The first upper communicating subspace 613 communicates top ends of the first upward conveying subspace 611 and the first downward conveying subspace 612, and extends in the front-rear direction (F). The first lower communicating subspace 614 communicates bottom ends of the first upward conveying subspace 611 and the first downward conveying subspace 612, and extends in the front-rear direction (F). The first upward conveying subspace 611 and the first downward conveying subspace 612 are stored with the charging seats 2. Specifically, in this embodiment, for each first battery charging apparatus 5, each of the first upward conveying subspace 611 and the first downward conveying subspace 612 of the first conveying space 610 is configured to be straight, and the charging seats 2 that are stored in each of the first upward conveying subspace 611 and the first downward conveying subspace 612 are stacked in the up-down direction (U).

For each first battery charging apparatus 5, the first charging rail 62 includes two first electrode plates 621 that are disposed in the first conveying space 610 of the first charging station 61, that are spaced apart from each other, that are parallel to each other, and that cooperate with each other to supply the electrical energy. Each of the first electrode plates 621 has a first upward section 622, a first downward section 623 and a first interconnecting section 624. The first upward section 622 extends in the up-down direction (U) along the first upward conveying subspace 611 of the first conveying space 610. The first downward section 623 extends in the up-down direction (U) along the first downward conveying subspace 612 of the first conveying space 610. The first interconnecting section 624 interconnects top ends of the first upward section 622 and the first downward section 623, and extends in the front-rear direction (F) in the first upper communicating subspace 613 of the first conveying space 610.

For each first battery charging apparatus 5, one of the first blocking subunits 63 is located in the first upper communicating subspace 613 (i.e., the one of the first blocking subunits 63 protrudes from the first charging station 61 into the first upper communicating subspace 613) of the first conveying space 610, and is located below the first interconnecting sections 624 of the first electrode plates 621. The other one of the first blocking subunits 63 is located in the first lower communicating subspace 614 (i.e., the other one of the first blocking subunits 63 protrudes from the first charging station 61 into the first lower communicating subspace 614) of the first conveying space 610. Specifically, the other one of the first blocking subunits 63 is located at a rear end of the first lower communicating subspace 614. As for the effects that the first blocking subunits 63 can achieve, relevant descriptions will be provided after detailed descriptions of the first conveying unit 7 and the lower conveying apparatuses 8.

Figure 9:
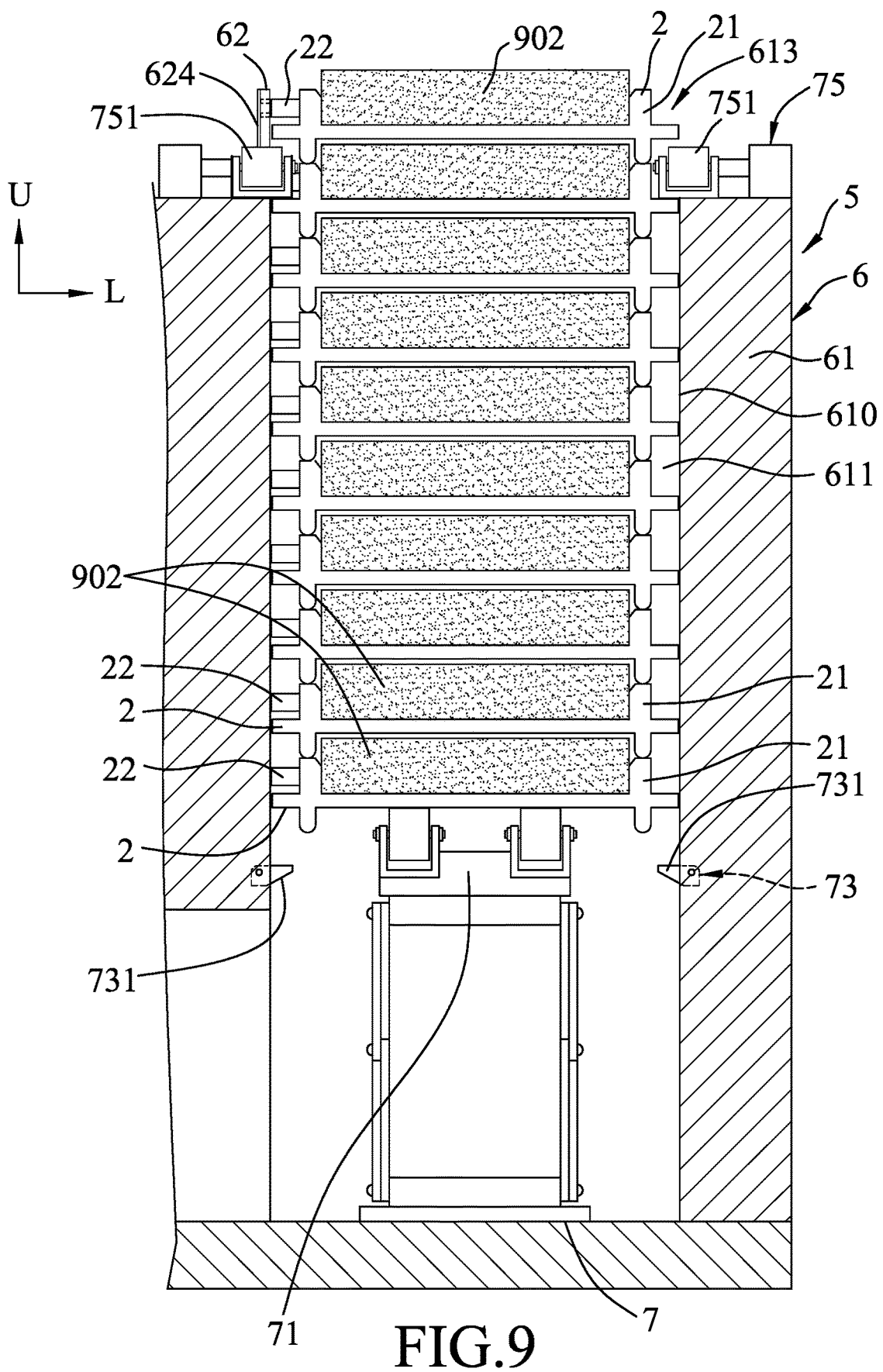
FIG. 9 is a fragmentary sectional view illustrating a first upper conveying device of the embodiment in a conveying state.
Figure 10:
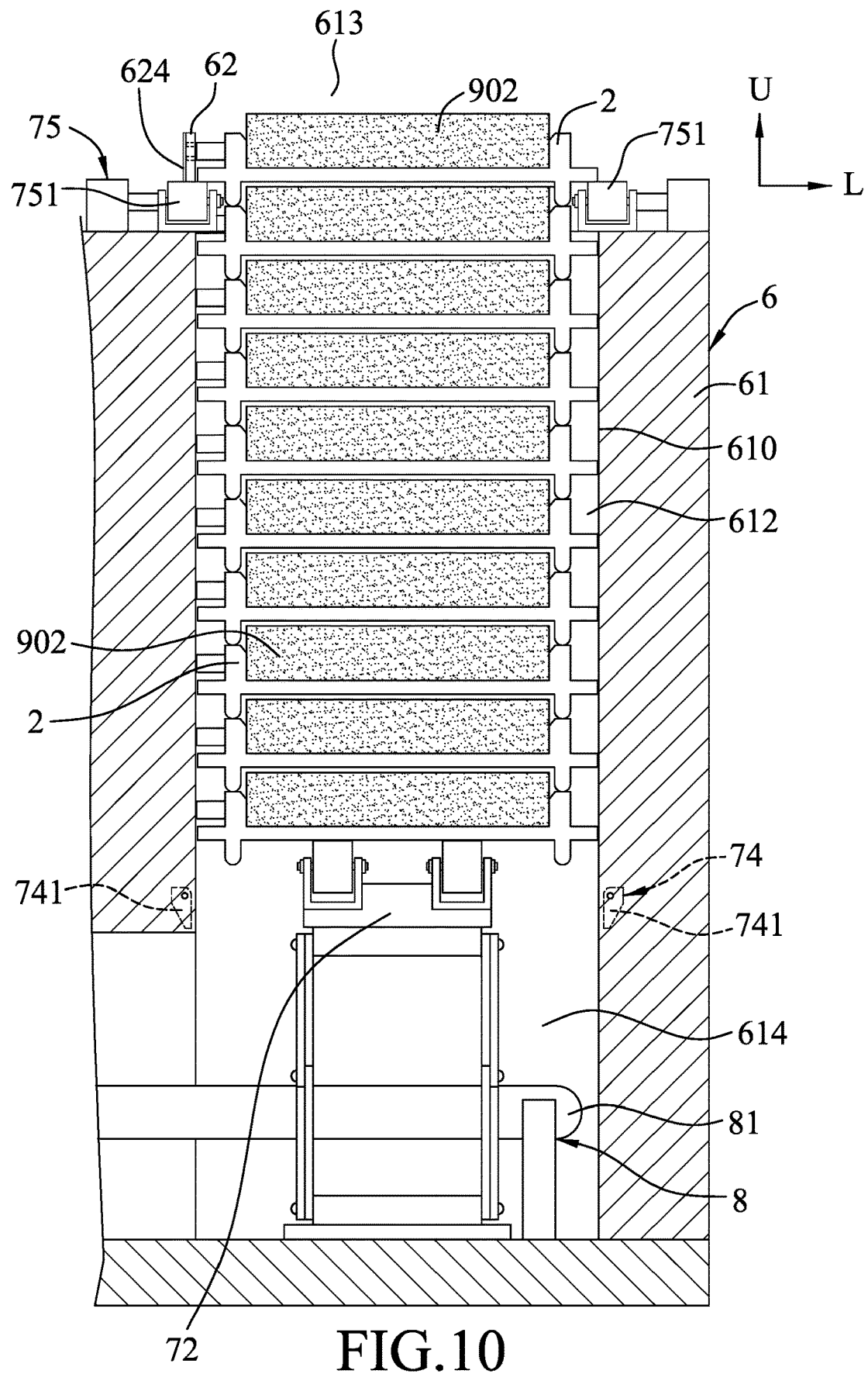
FIG. 10 is a fragmentary sectional view illustrating a first carrying device of the embodiment carrying the charging seats when a first blocking device is in an unblocking state.

Referring further to FIGS. 9 and 10, for each first battery charging apparatus 5, the first conveying unit 7 includes a first pushing device 71, a first carrying device 72, a first movement limiting device 73, a first blocking device 74 and a first upper conveying device 75. The first pushing device is disposed at the first lower communicating subspace 614 of the first battery charging unit 6 and is located under the first upward conveying subspace 611 of the first battery charging unit 6. The first carrying device 72 is disposed at the first lower communicating subspace 614, and is located under the first downward conveying subspace 612 of the first battery charging unit 6. The first movement limiting device 73 is disposed at the first charging station 61 of the first battery charging unit 6 and is located in a bottom end of the first upward conveying subspace 611 (i.e., the first movement limiting device 73 protrudes from the first charging station 61 into the bottom end of the first upward conveying subspace 611). The first blocking device 74 is disposed at the first charging station 61 and is located in a bottom end of the first downward conveying subspace 612 (i.e., the first blocking device 74 protrudes from the first charging station 61 into the bottom end of the first downward conveying subspace 612). The first upper conveying device 75 is disposed at a top end of the first charging station 61.

Via the first conveying unit 7, for each first battery charging apparatus 5, when one of the charging seats 2 entering the first conveying space 610 is carried and moved by the first conveying unit 7, at least one of the rest of the charging seats 2 that is in the first conveying space 610 is pushed by the one of the charging seats 2 to move along the first conveying space 610 of the first battery charging unit 6. Specifically, the charging seats 2 enter the first lower communicating subspace 614 of the first conveying space 610, and the first pushing device 71 of the first conveying unit 7 disposed at the first lower communicating subspace 614 is operable to carry the charging seats 2, to convey the charging seats 2 that enter the first conveying space 610, and to upwardly push the charging seats 2 that are in the first conveying space 610 so that the charging seats 2 move upwardly. Because the charging seats 2 that are stored in the first upward conveying subspace 611 of the first conveying space 610 are stacked in the up-down direction (U), when the first pushing device 71 upwardly pushes one of the charging seats 2 that enters the first lower communicating subspace 614, the charging seats 2 that are stored in the first upward conveying subspace 611 are pushed by the one of the charging seats 2 to move upwardly along the first upward conveying subspace 611.

For each first battery charging apparatus 5, by the first movement limiting device 73, the charging seats 2 are only permitted one-way movement (i.e., from the first lower communicating subspace 614 to the first upward conveying subspace 611 of the first conveying space 610). Specifically, the first movement limiting device 73 is located under the charging seats 2 that are stored in the first upward conveying subspace 611, and includes four first movement limiting protrusions 731 (only two of the first movement limiting protrusions 731 are visible due to the viewing angle in FIG. 9). Two of the first movement limiting protrusions 731 are disposed at one side of the first charging station 61 of the first battery charging unit 6, and are spaced apart from each other. The other two of the first movement limiting protrusions 731 are disposed at another side of the first charging station 61 opposite to the two of the first movement limiting protrusions 731 in the left-right direction (L), and are spaced apart from each other. The two of the first movement limiting protrusions 731 respectively correspond in position to the other two of the first movement limiting protrusions 731, and respectively protrude toward the other two of the first movement limiting protrusions 731 into the bottom end of the first upward conveying subspace 611 of the first battery charging unit 6 in the left-right direction (L). The other two of the first movement limiting protrusions 731 respectively protrude toward the two of the first movement limiting protrusions 731 into the bottom end of the first upward conveying subspace 611 of the first battery charging unit 6 in the left-right direction (L). The first movement limiting protrusions 731 are pivotable and are convertible between a free state, in which the first movement limiting protrusions 731 cooperatively abut against a lowermost one of the charging seats 2 that are stored in the first upward conveying subspace 611 to support the charging seats 2 that are stored in the first upward conveying subspace 611, and a pushed state, in which the first movement limiting protrusions 731 are pushed upwardly by one of the charging seats 2 that enters the first lower communicating subspace 614 of the first conveying space 610 and that is pushed upwardly by the first pushing device 71, so that the first movement limiting protrusions 731 pivot relative to the first charging station 61. When the first movement limiting protrusions 731 are in the pushed state, the one of the charging seats 2 that is pushed upwardly by the first pushing device 71 is permitted to enter the first upward conveying subspace 611 and to upwardly move past the first movement limiting protrusions 731. When the one of the charging seats 2 moves past the first movement limiting protrusions 731, the first movement limiting protrusions 731 pivot back to convert to the free state, and the one of the charging seats 2 that moves past the first movement limiting protrusions 731 becomes the lowermost one of the charging seats 2 that are stored in the first upward conveying subspace 611. When the first movement limiting protrusions 731 convert to the free state, the first pushing device 71 is operated to move downwardly. At this time, the first movement limiting protrusions 731 cooperatively abut against the one of the charging seats 2 that moves past the first movement limiting protrusions 731 (i.e., the lowermost one of the charging seats 2 that are stored in the first upward conveying subspace 611) to support the charging seats 2 that are stored in the first upward conveying subspace 611. That is to say, the first movement limiting protrusions 731 are generally in the free state and are converted to the pushed state only when an external force (e.g., one of the charging seats 2 that is upwardly pushed) is exerted thereon.

For each first battery charging apparatus 5, the first carrying device 72 is operable to move upwardly to carry the charging seats 2 that are stored in the first downward conveying subspace 612 of the first conveying space 610 of the first battery charging unit 6. The first blocking device 74 is located under the charging seats 2 that are stored in the first downward conveying subspace 612 (i.e., under the lowermost one of the charging seats 2 stored in the first downward conveying subspace 612), and includes a plurality of first blocking protrusions 741 (only two of the first blocking protrusions 741 are visible due to the viewing angle in each of FIGS. 10 and 11). In this embodiment, the first blocking device 74 includes four first blocking protrusions 741. Two of the first blocking protrusions 741 are disposed at one side of the first charging station 61 of the first battery charging unit 6, and are spaced apart from each other. The other two of the first blocking protrusions 741 are disposed at another side of the first charging station 61 opposite to the two of the first blocking protrusions 741 in the left-right direction (L), and are spaced apart from each other. The two of the first blocking protrusions 741 respectively correspond in position to the other two of the first blocking protrusions 741, and respectively protrude toward the other two of the first blocking protrusions 741 into the bottom end of the first downward conveying subspace 612 of the first battery charging unit 6 in the left-right direction (L). The other two of the first blocking protrusions 741 respectively protrude toward the two of the first blocking protrusions 741 into the bottom end of the first downward conveying subspace 612 of the first battery charging unit 6 in the left-right direction (L). The first blocking device is operable to convert between a blocking state (see FIG. 11), in which the two of the first blocking protrusions 741 and the other two of the first blocking protrusions 741 protrude into the bottom end of the first downward conveying subspace 612 in the left-right direction (L) to cooperatively carry the charging seats 2 stored in the first downward conveying subspace 612 and cooperatively prevent the charging seats 2 stored in the first downward conveying subspace 612 from leaving the first downward conveying subspace 612, and an unblocking state (see FIG. 10), in which the first blocking protrusions 741 leave the bottom end of the first downward conveying subspace 612 (e.g., each of the first blocking protrusions 741 pivots relative to the first charging station 61, or retracts) so as to allow the charging seats 2 stored in the first downward conveying subspace 612 to leave the first downward conveying subspace 612 and enter the first lower communicating subspace 614 of the first conveying space 610.

For the frontmost one of the first battery charging apparatuses 5, the first pushing device 71 is operated to carry and rearwardly convey each of the charging seats 2 that are rearwardly conveyed by the first moving unit 31 so that the charging seats 2 enter the first lower communicating subspace 614 of the frontmost one of the first battery charging apparatuses 5 one by one. Then, the charging seats 2 enter the first upward conveying subspace 611 and are moved upwardly past the first movement limiting device 73 one by one via the effects of the first pushing device 71 and the first movement limiting device 73 as mentioned earlier.

For each first battery charging apparatus 5, the first carrying device 72 is operable to move upwardly to carry the charging seats 2 stored in the first downward conveying subspace 612 of the first battery charging unit 6. Specifically, when the first blocking device 74 is in the blocking state, the first carrying device 72 is operated to move upwardly to push the charging seats 2 upwardly so that the charging seats 2 are separated from the first blocking protrusions 741 of the first blocking device 74 (i.e., the lowermost one of the charging seats 2 stored in the first downward conveying subspace 612 is separated from the first blocking protrusions 741). Then, when the first blocking device 74 is converted into the unblocking state, the first carrying device 72 is operable to move downwardly to convey the lowermost one of the charging seats 2 stored in the first downward conveying subspace 612 so that the lowermost one of the charging seats 2 stored in the first downward conveying subspace 612 moves past the first blocking device 74. When the lowermost one of the charging seats 2 moves past the first blocking device 74, the first blocking device 74 is converted into the blocking state so that the rest of the charging seats 2 are carried by the first blocking protrusions 741 and are prevented from leaving the first downward conveying subspace 612. Then, the first carrying device 72 is operated to move downwardly so that the lowermost one of the charging seats 2 is conveyed to the first lower communicating subspace 614 of the first battery charging unit 6. Except for a rearmost one of the first battery charging apparatuses 5, the first carrying device 72 of each one of the first battery charging apparatuses 5 is operable to convey the lowermost one of the charging seats 2 of the first battery charging apparatus 5 rearwardly to the first pushing device 71 of another one of the first battery charging apparatuses 5 that is adjacent to the first battery charging apparatus 5 and that is located at a rear side of the first battery charging apparatus 5. When the first carrying device 72 of one of the first battery charging apparatuses 5 conveys the lowermost one of the charging seats 2 of the first battery charging apparatus 5 rearwardly to the first pushing device 71 of another one of the first battery charging apparatuses 5 that is adjacent to the first battery charging apparatus 5 and that is located at a rear side of the first battery charging apparatus 5, the first pushing device 71 of another one of the first battery charging apparatuses 5 is operated to carry and rearwardly convey the lowermost one of the charging seats 2. Then, the charging seats 2 enter the first upward conveying subspace 611 and are moved upwardly past the first movement limiting device 73 of another one of the first battery charging apparatuses 5 one by one via the operations of the first pushing device 71 and the first movement limiting device 73 of another one of the first battery charging apparatuses 5 as mentioned earlier. There will be no further details describing the first carrying device 72, since in this embodiment, the conveying mechanism of the first carrying device 72 for conveying the charging seats 2 in the front-rear direction (F) has a structure similar to that of the first moving unit 31 and that of the second moving unit 32 in order to convey the charging seats 2 rearwardly.

For each first battery charging apparatus 5, when the first pushing device 71 pushes the charging seats 2 that are in the first upward conveying subspace 611 of the first conveying space 610 upwardly, an uppermost one of the charging seats 2 that are stored in the first upward conveying subspace 611 enters the first upper communicating subspace 613 of the first conveying space 610. The first upper conveying device 75 is operable to convert between a conveying state and a releasing state, and includes two first upper conveying members 751 that are spaced apart from each other in the left-right direction (L) and that extend in the front-rear direction (L). Each of the first upper conveying members 751 is movable relative to the first charging station 61 of the first battery charging unit 6. When the first upper conveying device 75 is in the conveying state (see FIG. 9), the first upper conveying members 751 move toward each other in the left-right direction (L) to enter the first upper communicating subspace 613 of the first battery charging unit 6 to carry the uppermost one of the charging seats 2 that enters the first upper communicating subspace 613 and to convey the uppermost one of the charging seats 2 in the front-rear direction (F). Specifically, when the first upper conveying device 75 is in the conveying state, the first upper conveying members 751 are operated to rearwardly convey the uppermost one of the charging seats 2 along the first upper communicating subspace 613 so that the uppermost one of the charging seats 2 is moved onto the first downward conveying subspace 612 of the first battery charging unit 6. When the first upper conveying device 75 is in the releasing state (see FIG. 11), the first upper conveying members 751 move away from each other in the left-right direction (L) to leave the first upper communicating subspace 613 so that the first upper conveying device 75 releases the uppermost one of the charging seats 2. There will be no further details describing the first upper conveying members 751 since in this embodiment, a conveying mechanism of each of the first upper conveying members 751 for conveying the charging seats 2 in the front-rear direction (F) has a structure similar to that of the first moving unit 31 and that of the second moving unit 32 in order to convey the uppermost one of the charging seats 2 rearwardly.

Each of the second battery charging apparatuses 5' has a structure that is opposite to that of each of the first battery charging apparatuses 5 in the front-rear direction (F). A brief description of what each of the second battery charging apparatuses 5' has is given below for better understanding (i.e., the description of each of the second battery charging apparatuses 5' below may not be used to limit what each of the second battery charging apparatuses 5' may have). Each of the second battery charging apparatuses 5' has a second conveying space 610' and a second pushing device 71'. The second conveying space 610' has a second upward conveying subspace 611', a second downward conveying subspace 612', a second upper communicating subspace 613' and a second lower communicating subspace 614'. The second upward conveying subspace 611' and the second downward conveying subspace 612' of each one of the second battery charging apparatuses 5' are arranged oppositely to the first upward conveying subspace 611 and the first downward conveying subspace 612 of each one of the first battery charging apparatuses 5 in the front-rear direction (F). Specifically, the second battery charging apparatuses 5' and the first battery charging apparatuses 5 are arranged in the left-right direction (L) in a manner that the second upward conveying subspace 611' and the second downward conveying subspace 612' of each one of the second battery charging apparatuses 5' respectively correspond in position to the first downward conveying subspace 612 and the first upward conveying subspace 611 of a respective one of the first battery charging apparatuses 5. For each second battery charging apparatus 5', the second upper communicating subspace 613' communicates top ends of the second upward conveying subspace 611' and the second downward conveying subspace 612'. The second lower communicating subspace 614' communicates bottom ends of the second upward conveying subspace 611' and the second downward conveying subspace 612'. The second pushing device 71' is disposed at the second lower communicating subspace 614', is located under the second upward conveying subspace 611', and has the same functionality as the first pushing device 71 of each one of the first battery charging apparatuses 5. As a matter of convenience, each of the reference numerals of the elements and the spaces of each of the second battery charging apparatuses 5', and each of the reference numerals of the elements and the spaces of the respective one of the first battery charging apparatuses 5 only differ in a prime symbol in all the Figures and in the disclosure when they have the same functionality. Furthermore, instead of starting with the word "first", the names of the elements and the spaces of the second battery charging apparatuses 5' start with the word "second" to indicate the elements and the spaces, which have similar characteristics to the ones in the first battery charging apparatuses 5.

Figure 12:
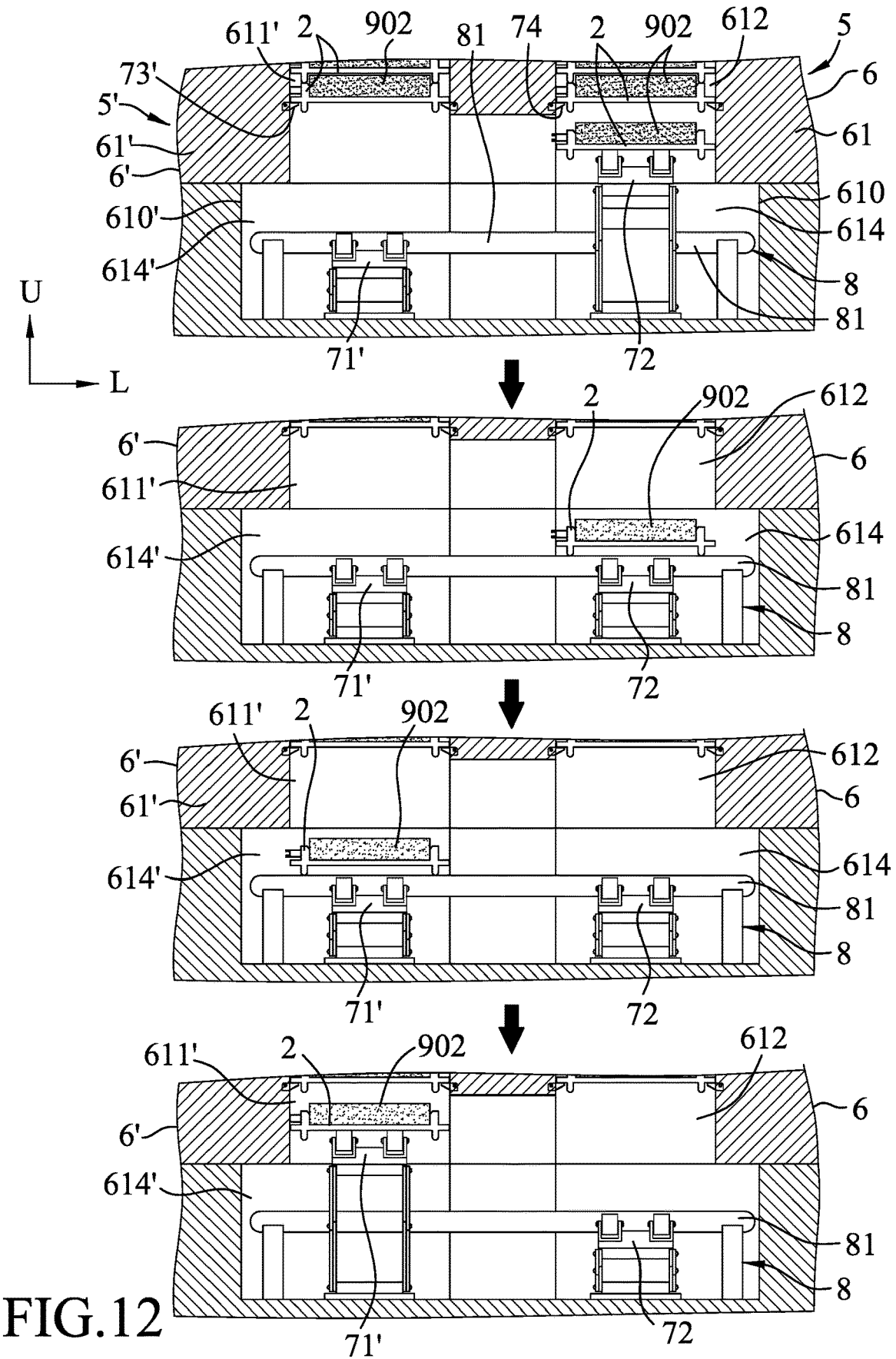
FIG. 12 illustrates a lower conveying apparatus of the embodiment conveying one of the charging seats from one of first charging stations of the embodiment to another one of the first charging stations.

Referring further to FIG. 12, in cooperation with FIG. 8, each of the lower conveying apparatuses 8 of the battery charging subsystem 4 is disposed at the first lower communicating subspace 614 of the first battery charging unit 6 of a respective one of the first battery charging apparatuses 5, and includes two lower conveying rails (only one of the lower conveying rails 81 is visible due to the viewing angle in FIG. 12) that are spaced apart from each other in the front-rear direction (F) and that extend in the left-right direction (L). Specifically, for each lower conveying apparatus 8, the lower conveying rails 81 extend from the first lower communicating subspace 614 of the respective one of the first battery charging apparatuses 5 into the second lower communicating subspace 614' of a respective one of the second battery charging apparatuses 5' that is adjacent to the first battery charging apparatus 5 (i.e., the respective one of the second battery charging apparatuses 5' that corresponds in position to the first battery charging apparatus 5). The lower conveying apparatus 8 are spaced apart from each other in the front-rear direction (F). For each lower conveying apparatus 8, the lower conveying rails 81 extend across the first carrying device 72 of the respective one of the first battery charging apparatuses 5 and the second pushing device 71' of the respective one of the second battery charging apparatuses 5', are operable to carry the lowermost one of the charging seats 2 that is conveyed downwardly to the first lower communicating subspace 614 of the first battery charging apparatus 5 by the first carrying device 72 of the first battery charging apparatus 5, and are operable to convey the lowermost one of the charging seats 2 away from the first charging station 61 of the first battery charging apparatus 5 to the second charging station 61' of the second battery charging apparatus 5' in the left-right direction (L). Specifically, for each lower conveying apparatus 8, the lower conveying rails 81 are operated to convey the lowermost one of the charging seats 2 leaving the first downward conveying subspace 612 of the respective one of the first battery charging apparatuses 5 to the second pushing device 71' of the respective one of the second battery charging apparatuses 5' (i.e., the lowermost one of the charging seats 2 is located on the second pushing device 71') so that the second pushing device 71' of the second battery charging apparatus 5' is operable to carry the lowermost one of the charging seats 2. Then, the second pushing device 71' is operated to upwardly pushes the lowermost one of the charging seats 2 so that the lowermost one of the charging seats 2 is conveyed from the second lower communicating subspace 614' of the second charging station 61' to the second upward conveying subspace 611'. In this embodiment, the lowermost one of the charging seats 2 carries a battery 902 when conveyed by each of the lower conveying apparatuses 8. There will be no further details describing the lower conveying apparatuses 8 since in this embodiment, a conveying mechanism of each of the lower conveying apparatuses 8 has a structure similar to that of the first moving unit and that of the second moving unit 32 of the respective one of the first battery charging apparatuses 5 in order to convey the lowermost one of the charging seats 2 stored in the first downward conveying subspace 612 of the first battery charging apparatus 5 in the left-right direction (L).

In operation, the battery charging and swapping system 100 is controlled by the control system to swap a battery 902 that is mounted to the electric vehicle 900 for another battery 902 that is stored in the battery charging and swapping system 100, and then to store and charge the battery 902. A detailed description of an overall operation of the battery charging and swapping system 100 is given below. For better understanding of the overall operation of the battery charging and swapping system 100, the battery 902 that is mounted to the electric vehicle 900 is assumed to be almost empty (i.e., necessary to be charged) and is named "the empty battery 902" hereinafter. The batteries 902 that are carried by the charging seats 2 are assumed to be fully charged.

Referring back to FIGS. 4, 5 and 13, when a driver needs to swap the empty battery 902 that is mounted to the electric vehicle 900 for one of the batteries 902 that are fully charged, the driver drives the electric vehicle 900 in the advancing direction (A) to the top end of the first vehicle carrying subunit 333 of the vehicle conveying unit so that the first vehicle carrying subunit 333 that is in the extended state carries the electric vehicle 900. At this time, one of the charging seats 2 that is not carrying any of the batteries 302 is carried by the first moving unit 31 of the battery swapping subsystem 3 and is located under the empty battery 902 that is mounted to the electric vehicle 900. Then, the first vehicle carrying subunit 333 is converted into the retracted state so that the electric vehicle 900 is conveyed downwardly onto the vehicle conveying subunit 331 of the vehicle conveying unit 33. The battery removing unit 34 of the battery swapping subsystem 3 is moved upwardly to push the one of the charging seats 2 carried by the first moving unit 31 upwardly such that the empty battery 902 is connected to and is carried by the one of the charging seats 2.

Next, referring back to FIGS. 14 to 16, the vehicle conveying subunit 331 conveys the electric vehicle 900 away from the battery removing unit 34 along the vehicle conveying path so that the empty battery 902 that is connected to and that is carried by the one of the charging seats 2 is removed from the electric vehicle 900 by the relative movement between the empty battery 902 and the electric vehicle 900 in the left-right direction (L). At this time, another one of the charging seats 2, that is being carried by the second moving unit 32 of the battery swapping subsystem 3 and that is itself carrying a fully charged battery 902, is pushed upwardly by the battery mounting unit 35 of the battery swapping subsystem 3 so that the another one of the charging seats 2 is on the vehicle conveying path. Then, the electric vehicle 900 that is conveyed by the vehicle conveying subunit 331 along the vehicle conveying path is conveyed toward the battery mounting unit 35 such that the battery 902 that is carried by the another one of the charging seats 2 is mounted to the electric vehicle 900. When the battery 902 that is carried by the another one of the charging seats 2 is mounted to the electric vehicle 900, the battery mounting unit 35 is moved downwardly such that the battery 902 and the another one of the charging seats 2 are separated (i.e., the battery mounting unit 35 carries the another one of the charging seats 2). At this time, the second vehicle carrying subunit 334 of the vehicle conveying unit 33 is converted from the retracted state into the extended state to carry and to upwardly convey the electric vehicle 900. Next, when the top end of the second vehicle carrying subunit 334 and the ground 904 are located at the same height, the driver may drive the electric vehicle 900 away from the second vehicle carrying subunit 334, and the driver has completed swapping the empty battery 902 for the fully charged battery 902.

Referring further to FIG. 7, while also referring to FIG. 6, the another one of the charging seats 2 (i.e., the another one of the charging seats 2 that was mentioned in the last paragraph) that is carried by the battery mounting unit 35 is conveyed downwardly and is placed on the second moving unit 32. Then, the second moving unit 32 forwardly conveys the another one of the charging seats 2 along the second swapping path to the first seat lifting subunit 363 of the shifting unit 36 that is in the extended state. Next, the first seat lifting subunit 363 is converted into the retracted state to convey the another one of the charging seats 2 downwardly onto the seat shifting subunit 361 of the shifting unit 36. Afterwards, the seat shifting subunit 361 conveys the another one of the charging seats 2 in the left-right direction (L) to be located above the second seat lifting subunit 364 of the shifting unit 36 that is in the retracted state. After that, the second seat lifting subunit 364 is converted into the extended state to convey the another one of the charging seats 2 upwardly. When the top end of the second seat lifting subunit 364 and the first moving unit 31 are located at the same height, the second seat lifting subunit 364 conveys the another one of the charging seats 2 rearwardly to the first moving unit 31. Then, the first moving unit 31 conveys the another one of the charging seats 2 to be located above the battery removing unit 34 (i.e., the another one of the charging seats 2 is located on the battery removing unit 34) (see FIG. 4). At this time, the another one of the charging seats 2 is ready to be connected to and to carry another empty battery that has a structure similar to, or the same as the empty battery 902, and that is mounted to another electric vehicle having a structure similar to, or the same as the electric vehicle 900, and located over the battery removing unit 34. It is noted that, before the first moving unit 31 conveys the another one of the charging seats 2 to the battery removing unit 34, the one of the charging seats 2 (i.e., the one of the charging seats 2 that was mentioned in the last paragraph) and the empty battery 902 that is connected to and that is carried by the one of the charging seats 2 are conveyed downwardly by the battery removing unit 34 such that the one of the charging seats 2 that carries the empty battery 902 is carried by the first moving unit 31 and is separated from the battery removing unit 34 (see FIG. 15).

Afterwards, referring back to FIGS. 8, 9 and 17, the one of the charging seats 2 that carries the empty battery 902 is rearwardly conveyed along the first swapping path by the first moving unit 31 to enter the first lower communicating subspace 614 of the first conveying space 610 of the frontmost one of the first battery charging apparatuses 5.

Then, the first pushing device 71 of the frontmost one of the first battery charging apparatuses 5 carries and conveys the one of the charging seats 2 that carries the empty battery 902 so that the one of the charging seats 2 is located under the first movement limiting device 73 of the frontmost one of the first battery charging apparatuses 5. It is noted that, at this time, each of the first upward conveying subspace 611 and the first downward conveying subspace 612 of the first conveying space 610 of the frontmost one of the first battery charging apparatuses 5 is stored with the charging seats 2 that respectively carry batteries 902 as shown in FIG. 8. The first pushing device 71 is operable to urge the one of the charging seats 2 to move past the first movement limiting device 73 so as to be electrically coupled to the first charging rail 62 of the first battery charging unit 6 of the frontmost one of the first battery charging apparatuses 5. At this time, the one of the charging seats 2 that carries the empty battery 902 is stored in the first upward conveying subspace 611 of the first conveying space 610, and is now the lowermost one of the charging seats 2 in the first upward conveying subspace 611, and the first movement limiting protrusions 731 of the first movement limiting device 73 are converted to the free state. Next, the first pushing device 71 is moved downwardly so that the first movement limiting protrusions 731 cooperatively abut against the one of the charging seats 2 that carries the empty battery 902 to support the charging seats 2 that are stored in the first upward conveying subspace 611 (i.e., the one of the charging seats 2 that carries the empty battery 902 is now separated from the first pushing device 71). The one of the charging seats 2 that carries the empty battery 902 is electrically coupled to the first charging rail 62 of the first battery charging unit 6 in a manner that the conductive members 222 of the one of the charging seats 2 are in the first tilting state and are respectively and electrically coupled to the first electrode plates 621 of the first charging rail 62. Specifically, the conductive members 222 of the one of the charging seats 2 are respectively and electrically coupled to the first upward sections 622 of the first electrode plates 621, and are located at two opposite sides of the first upward sections 622 of the first electrode plates 621 in the front-rear direction (F). When respectively and electrically coupled to the first electrode plates 621, the conductive members 222 of the one of the charging seats 2 are co-movable with the seat body 21 along the first electrode plates 621, and cooperate with each other to receive the electrical energy so that the charging control unit 23 of the one of the charging seats 2 supplies the empty battery 902 with the electrical energy. Therefore, the empty battery 902 can thus be charged.

For each charging seat 2, when the power receiving unit 22 is electrically coupled to the first charging rail 62 of one of the first battery charging apparatuses 5, the shaft 221 is rotatable relative to the first electrode plates 621 of the first battery charging apparatus 5 such that the conductive members 222 are convertible between the first tilting state and the second tilting state. The seat body 21 is allowed to move upwardly along the first upward sections 622 to the first interconnecting sections 624 and rearwardly along the first interconnecting sections 624 of the first electrode plates 621 when the conductive members 222 are in the first tilting state. The seat body 21 is allowed to move rearwardly along the first interconnecting sections 624 to the first downward sections 623 and downwardly along the first downward sections 623 of the first electrode plates 621 when the conductive members 222 are in the second tilting state.

In a situation that the first upward conveying subspace 611 of the first conveying space 610 of one of the first battery charging apparatuses 5 is fully stored with the charging seats 2 that respectively carry the batteries 902, an uppermost one of the charging seats 2 that are stored in the first upward conveying subspace 611 will enter the first upper communicating subspace 613 of the first conveying space 610 when one of the charging seats 2 (e.g., the one of the charging seats 2 that carries the empty battery 902) is urged by the first pushing device 71 of the first battery charging apparatus 5 to move past the first movement limiting device 73 of the first battery charging apparatus 5 to be stored as the lowermost one of the charging seats 2 in the first upward conveying subspace 611. At this time, the conductive members 222 of the uppermost one of the charging seats 2 are in the first tilting state, and the first upper conveying device 75 of the first battery charging apparatus 5 is in the conveying state to convey the uppermost one of the charging seats 2 that enters the first upper communicating subspace 613 in the front-rear direction (F) (i.e., the uppermost one of the charging seats 2 moves upwardly along the first upward sections 622 to the first interconnecting sections 624 of the first battery charging apparatus 5).

When the uppermost one of the charging seats 2 that is conveyed by the first upper conveying device of the one of the first battery charging apparatuses 5 moves rearwardly along the first interconnecting sections 624 of the first electrode plates 621 of the first battery charging apparatus 5, with the conductive members 222 thereof in the first tilting state being kept electrically coupled to the first interconnecting sections 624, and passes the one of the first blocking subunits 63 of the first battery charging apparatus 5, the one of the first blocking subunits 63 elastically abuts against one of the conductive members 222 of the uppermost one of the charging seats 2 that is adjacent thereto to urge the shaft 221 of the uppermost one of the charging seats 2 to rotate relative to the seat body (not shown in FIG. 17) so that the conductive members 222 are converted from the first tilting state to the second tilting state. After that, the uppermost one of the charging seats 2 is allowed to move rearwardly along the first interconnecting sections 624 to the first downward sections 623 of the first battery charging apparatus 5.

Figure 11:
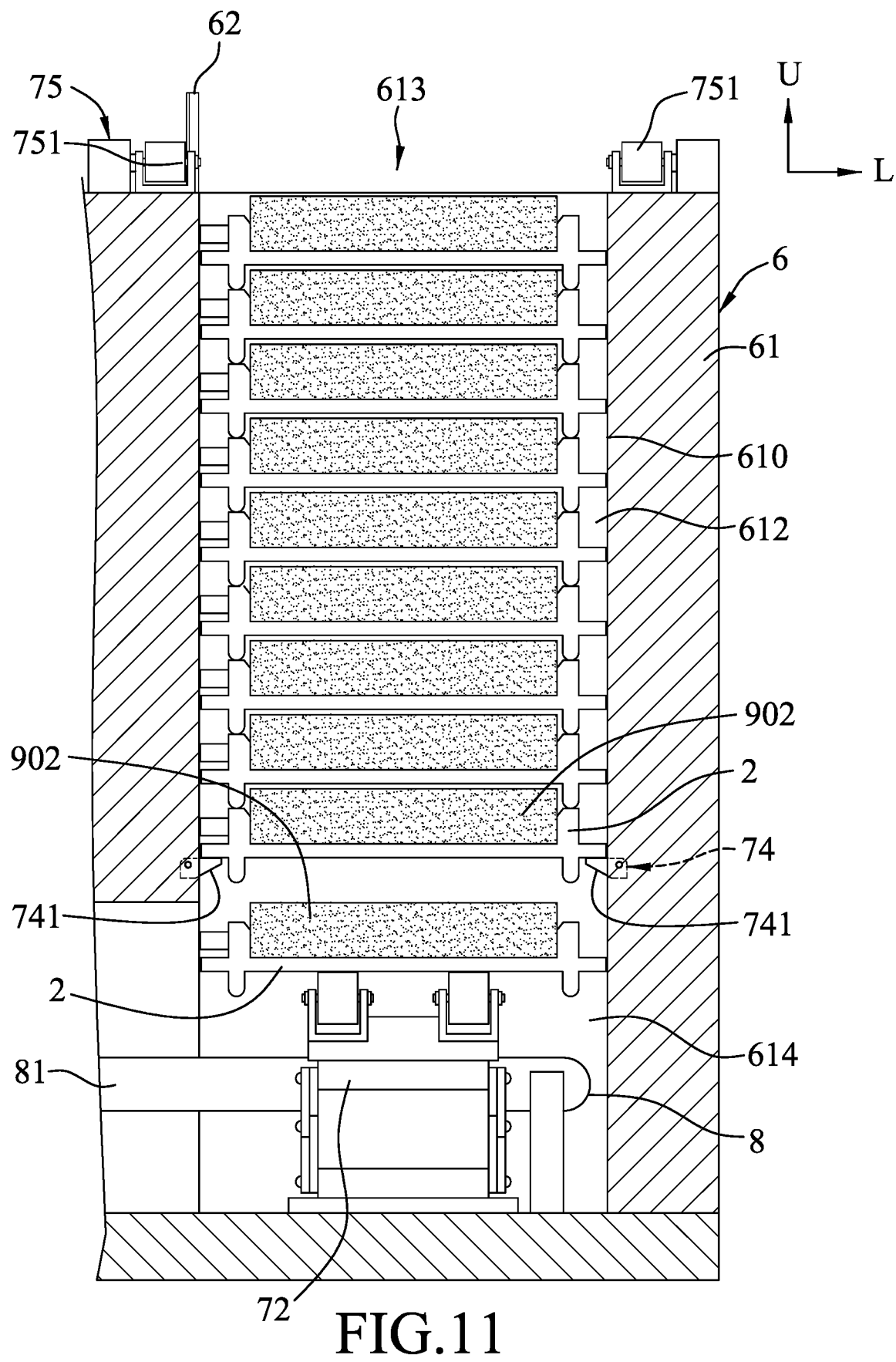
FIG. 11 is a fragmentary sectional view illustrating the first carrying device carrying one of the charging seats when the first blocking device is in a blocking state.

Afterwards, referring further to FIGS. 11 and 12, in cooperation with FIG. 10, when the uppermost one of the charging seats 2 that is in the first upper communicating subspace 613 is located above the first downward conveying subspace 612 of the first battery charging unit 6 of the one of the first battery charging apparatuses 5, the first carrying device 72 of the first battery charging apparatus 5 is moved upwardly to upwardly push the charging seats 2 that are stored in the first downward conveying subspace 612 so that the charging seats 2 are separated from the first blocking protrusions 741 of the first blocking device 74 of the first battery charging apparatus 5 and an uppermost one of the charging seats 2 that are stored in the first downward conveying subspace 612 abuts against the uppermost one of the charging seats 2 that is in the first upper communicating subspace 613. Then, the first blocking device 74 is converted into the unblocking state, and the first carrying device 72 is moved downwardly to convey a lowermost one of the charging seats 2 stored in the first downward conveying subspace 612 so that the lowermost one of the charging seats 2 stored in the first downward conveying subspace 612 moves past the first blocking device 74. At this time, the uppermost one of the charging seats 2 that is in the first upper communicating subspace 613 and that is abutted against by the uppermost one of the charging seats 2 that are stored in the first downward conveying subspace 612 is moved downwardly along the first downward sections 623 to enter the first downward conveying subspace 612 so as to become the uppermost one of the charging seats 2 that are stored in the first downward conveying subspace 612. When the lowermost one of the charging seats 2 moves past the first blocking device 74, the first blocking device 74 is converted into the blocking state so that the rest of the charging seats 2 are carried by the first blocking protrusions 741 and are prevented from leaving the first downward conveying subspace 612. When the first carrying device 72 of the one of the first battery charging apparatuses 5 carries the lowermost one of the charging seats 2 that are stored in the first downward conveying subspace 612 of the first battery charging apparatus 5, the first carrying device 72 is operable to convey the lowermost one of the charging seats 2 in two means. One of the means is that the lowermost one of the charging seats 2 is conveyed downwardly so that the respective one of the lower conveying apparatuses 8 is operated to convey the lowermost one of the charging seats 2 in the left-right direction (L) to the second pushing device 71' of the respective one of the second battery charging apparatuses 5' (i.e., the lowermost one of the charging seats 2 is located on the second pushing device 71'). Then, the second pushing device 71' of the second battery charging apparatus 5' upwardly pushes the lowermost one of the charging seats 2 so that the lowermost one of the charging seats 2 enters the second upward conveying subspace 611' of the second charging station 61'. After that, the lowermost one of the charging seats 2 is electrically coupled to the second charging rail 62' (not shown in FIG. 12) of the second battery charging unit 6' and will be conveyed in the same way as the one of the charging seats 2 that carries the empty battery 902, which was mentioned before.

As for the other one of the means, referring back to FIGS. 8 and 18, the lowermost one of the charging seats 2 that carries the respective one of the batteries 902 is conveyed rearwardly by the first carrying device 72 of the one of the first battery charging apparatuses 5, except for the rearmost one of the first battery charging apparatuses 5 as mentioned before, to the first pushing device 71 of another one of the first battery charging apparatuses that is adjacent to the first battery charging apparatus 5 and that is located at the rear side of the first battery charging apparatus 5. Then, the battery 902 that is carried by the lowermost one of the charging seats 2 is kept charged in another one of the first battery charging apparatuses 5 via the previously mentioned operations of the frontmost one of the first battery charging apparatuses 5.

Specifically, for each first battery charging apparatus 5, the other one of the first blocking subunits 63 is located in the first lower communicating subspace 614 of the first conveying space 610 and is located at a rear of the first carrying device 72. When one of the charging seats 2 (e.g., the lowermost one of the charging seats 2 in the last paragraph) is conveyed rearwardly by the first carrying device 72, with the conductive members 222 thereof in the second tilting state, and passes the other one of the first blocking subunits 63, the other one of the first blocking subunits 63 elastically abuts against one of the conductive members 222 of the one of the charging seats 2 that is adjacent thereto to urge the shaft 221 of the charging seat 2 to rotate relative to the seat body 21 so that the conductive members 222 are converted from the second tilting state to the first tilting state. Therefore, when the one of the charging seats that is rearwardly conveyed to enter the first lower communicating subspace 614 of another one of the first battery charging apparatuses 5, the first pushing device 71 of the another one of the first battery charging apparatuses 5 is operable to urge the one of the charging seats 2, whose conductive members 222 have been converted from the second tilting state to the first tilting state, to be electrically coupled to the first charging rail 62 of the first battery charging unit 6 of the another one of the first battery charging apparatuses 5. There will be no further details describing how the charging seats 2 are conveyed in another one of the first battery charging apparatuses 5 since the charging seats 2 are conveyed in the same way as in the frontmost one of the first battery charging apparatuses 5 and the batteries 902 that are respectively carried by the charging seats 2 are charged in the same way as mentioned before.

Figure 19:
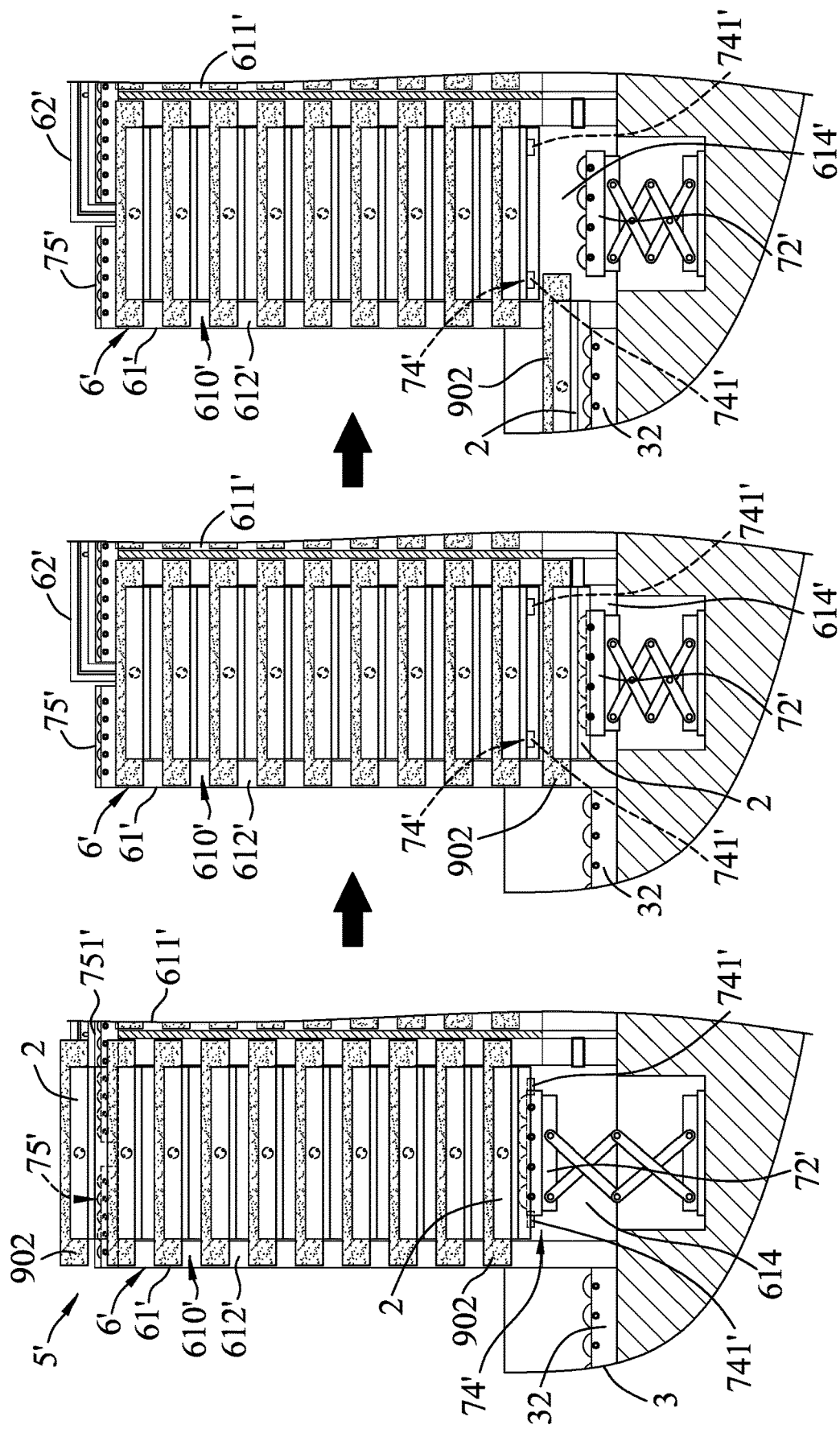
FIG. 19 illustrates a second carrying device of the embodiment conveying one of the charging seats to the second moving unit.

Referring further to FIG. 19, in cooperation with FIGS. 1 and 3, in order to move out a lowermost one of the charging seats 2 that carry the batteries 902 and that are stored in the second downward conveying subspace 612' of the frontmost one of the second battery charging apparatuses 5' from the frontmost one of the second battery charging apparatuses 5', the second carrying device 72' of the second battery charging apparatuses 5' is moved upwardly to upwardly push the charging seats 2 that are stored in the second downward conveying subspace 612' of the second battery charging apparatus 5' so that the charging seats 2 are separated from the second blocking protrusions 741' of the second blocking device 74' of the second battery charging apparatus 5'. Then, the second blocking device 74' is converted into the unblocking state, and the second carrying device 72' is moved downwardly to convey the lowermost one of the charging seats 2 stored in the second downward conveying subspace 612' so that the lowermost one of the charging seats 2 stored in the second downward conveying subspace 612' moves past the second blocking device 74'. When the lowermost one of the charging seats 2 moves past the second blocking device 74' and enters the second lower communicating subspace 614' of the second battery charging apparatus 5', the second blocking device 74' is converted into the blocking state so that the rest of the charging seats 2 are carried by the second blocking protrusions 741' and are prevented from leaving the second downward conveying subspace 612'. Afterwards, the second carrying device 72' is operated to forwardly convey the lowermost one of the charging seats 2 so that the lowermost one of the charging seats 2 is moved out from the frontmost one of the second battery charging apparatuses 5' and is carried by the second moving unit 32 of the battery swapping subsystem 3. At this time, the lowermost one of the charging seats 2 carries the fully charged battery 902. Next, the second moving unit 32 is operated to forwardly convey the lowermost one of the charging seats 2 to the battery mounting unit 35 of the battery swapping subsystem 3 (i.e., the lowermost one of the charging seats 2 is located over the battery mounting unit 35). At this time, the battery mounting unit 35 is operated to push the lowermost one of the charging seats 2 that carries the respective one of the batteries 902 upwardly onto the vehicle conveying path so that the battery 902 is ready to be mounted to another electric vehicle that has a structure similar to, or the same as the electric vehicle 900. After the lowermost one of the charging seats 2 that is carried by the battery mounting unit 35 is separated from the battery 902, the lowermost one of the charging seats 2 is conveyed to the battery removing unit 34 of the battery swapping subsystem 3 sequentially through the same effects of the second moving unit 32, the shifting unit 36 and the first moving unit 31 of the battery swapping subsystem 3 mentioned before.

It is noted that, in this embodiment, the battery charging subsystem 4 includes the first battery charging apparatuses 5 and the second battery charging apparatuses 5' that are arranged in the left-right direction (L), and the lower conveying apparatuses 8. However, in certain embodiments, the battery charging subsystem 4 may only include the first battery charging apparatuses 5 that are arranged in the front-rear direction (F) and the lower conveying apparatuses 8. In certain embodiments, the battery charging subsystem 4 may only include one first battery charging apparatus and one lower conveying apparatus. That is to say, the second battery charging apparatuses 5' may be omitted. In each of those embodiments that the second battery charging apparatuses 5' are omitted, the second moving unit 32 of the battery swapping subsystem 3 is operable to carry and convey the lowermost one of the charging seats 2 conveyed away from the first charging station 61 of the at least one first battery charging apparatus 5 by the at least one lower conveying apparatus 8 along the second swapping path.

Still in certain embodiments, the first battery charging apparatuses 5 and the second battery charging apparatuses 5' may be, but not limited to, alternately arranged in the left-right direction (L). Moreover, in certain embodiments where the second battery charging apparatuses 5' are omitted, the first battery charging apparatuses 5 may be arranged in the left-right direction (L). In those embodiments, the batteries 902 that are respectively carried by the charging seats 2 can still be charged when conveyed in the left-right direction (L) among the first battery charging apparatuses 5, or among the first battery charging apparatuses 5 and the second battery charging apparatuses 5'. Via the left-right arrangement of the first battery charging apparatuses 5, or the alternate arrangement of the first battery charging apparatuses 5 and the second battery charging apparatuses 5', the batteries 902 may be stored according to the categories, which may be, but not limited to, capacity, or the time that is required for one of the batteries 902 to fully charge. For example, some of the batteries 902 that have relatively high capacity, or that need a relatively long time to fully charge may be conveyed to the first battery charging apparatuses 5 or the second battery charging apparatuses 5' that are distal from the second moving unit 32 of the battery swapping subsystem 3 to be stored, while some of the batteries 902 that have relatively low capacity, that need a relatively short time to fully charge, or that are frequently swapped out, are conveyed to the first battery charging apparatuses 5 or the second battery charging apparatuses 5' that are proximate to the second moving unit 32 to be stored.

In addition, referring back to FIG. 8, in this embodiment, each of the lower conveying apparatuses is disposed at the respective one of the first battery charging apparatuses 5 and extends to the respective one of the second battery charging apparatuses 5'. However, in certain embodiments, each of the lower conveying apparatuses 8 may be disposed at the respective one of the second battery charging apparatuses 5', and each of them extends to the respective one of the first battery charging apparatuses 5. Still in certain embodiments, each of the first battery charging apparatuses 5 and the respective one of the second battery charging apparatuses 5' cooperatively form a battery charging apparatus pair. For each of the battery charging apparatus pair, two of the lower conveying apparatuses 8 that are spaced apart from each other in the front-rear direction (F) are provided. Specifically, one of the lower conveying apparatuses 8 extends between the first pushing device 71 of the first battery charging apparatuses 5 and the second carrying device 72' of the respective one of the second battery charging apparatuses 5', and the other one of the lower conveying apparatuses 8 extends between the first carrying device 72 of the first battery charging apparatuses 5 and the second pushing device 71' of the respective one of the second battery charging apparatuses 5'. By virtue of each of the first battery charging apparatuses 5 and the respective one of the second battery charging apparatuses 5' being disposed with a pair of the lower conveying apparatuses 8, the batteries 902 that are fast-charging may be moved out from the battery charging subsystem 4 more efficiently to meet operational requirements.

Figure 20:
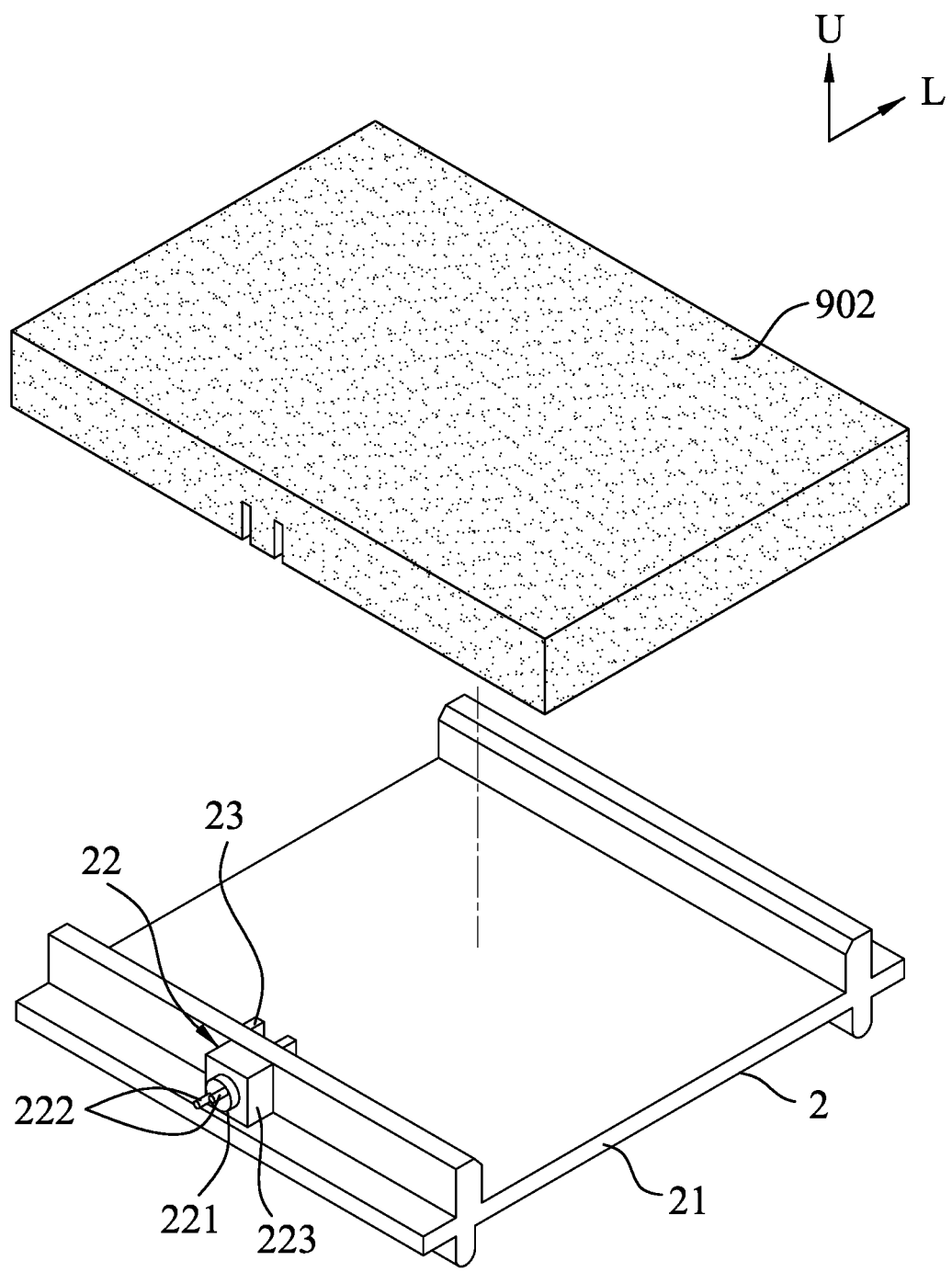
FIG. 20 is a perspective view of a battery and a modification of one of the charging seats.

Referring further to FIG. 20, in cooperation with FIGS. 17 and 18, in this embodiment, the conductive members 222 of each of the charging seats 2 are converted between the first tilting state and the second tilting state by the first blocking subunits 63 of each of the first battery charging apparatuses 5 and the second blocking subunits 63' of each of the second battery charging apparatuses 5' so as to be allowed to move along the first electrode plates 621 of the first battery charging apparatuses 5 and the second electrode plates 621' of the second battery charging apparatuses 5' and to cooperatively receive the electrical energy. However, as a modification of one of the charging seats 2 demonstrates (shown in FIG. 20), in certain embodiments, the power receiving unit 22 of each of the charging seats 2 may further include a shaft controlling member 223 that is mounted to the seat body 21 of the charging seat 2, that is connected to the shaft 221, and that is operable to urge the shaft 221 to rotate to convert the conductive members 222 between the first tilting state and the second tilting state. In those embodiments, the first blocking subunits 63 of the first battery charging apparatuses 5 and the second blocking subunits 63' of the second battery charging apparatuses 5' may be omitted.

Furthermore, in this embodiment, each of the charging seats 2 is in direct contact with the first charging rails 62 of the first battery charging apparatuses 5 and the second charging rails 62' of the second battery charging apparatuses 5' so as to receive the electrical energy. However, in certain embodiments, the first charging rails 62 of the first battery charging apparatuses 5 and the second charging rails 62' of the second battery charging apparatuses 5' may wirelessly transmit the electrical energy to the power receiving unit 22 of each of the charging seats 2 that are stored in the battery charging subsystem 4.

It is noted that, in this embodiment, each of the first upward conveying subspace 611 and the first downward conveying subspace 612 of the first conveying space 610 of each of the first battery charging apparatuses 5, and each of the second upward conveying subspace 611' and the second downward conveying subspace 612' of the second conveying space 610' of each of the second battery charging apparatuses 5' are configured to be straight so that the charging seats 2 that are stored in each of the first upward conveying subspace 611 of the first battery charging apparatus 5, the first downward conveying subspace 612 of the first battery charging apparatus 5, the second upward conveying subspace 611' of the second battery charging apparatus 5' and the second downward conveying subspace 612' of the second battery charging apparatus 5' are stacked straightly in the up-down direction. Consequently, the first charging station 61 of each of the first battery charging apparatuses 5 and the second charging station 61' of each of the second battery charging apparatuses 5' may be space-saving and compact. However, in certain embodiments, each of the first upward conveying subspace 611 and the first downward conveying subspace 612 of the first conveying space 610 of each of the first battery charging apparatuses 5, and each of the second upward conveying subspace 611' and the second downward conveying subspace 612' of the second conveying space 610' of each of the second battery charging apparatuses 5' may be configured as, but not limited to, a shape of a helix that is made up of a curve arranged in the up-down direction (U) so that the charging seats 2 are stacked helically and are conveyed helically therein.

In summary, via the first battery charging apparatuses 5 and the second battery charging apparatuses 5' of the battery charging subsystem 4, a large number of the charging seats 2 that respectively carry batteries 902 may be effectively stored, and each of the batteries 902 is constantly charged through the respective one of the charging seats 2 when the charging seats 2 are stored and conveyed. Via the battery swapping subsystem 3, a driver may swap the batteries 902 more efficiently and the swap is operated automatically. Therefore, the purpose of this embodiment is fulfilled.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A battery charging and swapping system adapted for charging and storing a plurality of batteries, said battery charging and swapping system comprising:
   a plurality of charging seats adapted for carrying the batteries, and adapted for being electrically coupled to the batteries to charge the batteries; and
   a battery charging subsystem including
      at least one first battery charging apparatus that provides accommodation for said charging seats, that conveys said charging seats, and that includes
         a first battery charging unit including
            a first charging station that defines a first conveying space, said charging seats being operable to enter said first conveying space so as to be stored, and
            a first charging rail that is disposed at said first charging station, and that is electrically coupled to said charging seats to supply electrical energy to said charging seats, and
         a first conveying unit disposed at said first charging station and operable to carry and convey said charging seats that enter said first conveying space;
   wherein, via said first conveying unit, when one of said charging seats entering said first conveying space is carried and moved by said first conveying unit, at least one of the rest of said charging seats that is in said first conveying space is pushed by the one of said charging seats to move along said first conveying space.

2. The battery charging and swapping system as claimed in claim 1, wherein said first conveying unit includes
 a first pushing device that is operable to carry said charging seats, to convey said charging seats that enter said first conveying space of said first battery charging unit, and to push said charging seats that are in said first conveying space so that said charging seats move, and
 a first movement limiting device by which said charging seats are only permitted a one-way movement, said first pushing device being operable to urge said charging seats to move past said first movement limiting device so as to be electrically coupled to said first charging rail of said first battery charging unit.

3. The battery charging and swapping system as claimed in claim 2, wherein:
 said first conveying space of said first battery charging unit has
  a first upward conveying subspace and a first downward conveying subspace that are isolated from each other, that are arranged in a front-rear direction, and that extend in an up-down direction perpendicular to the front-rear direction,
  a first upper communicating subspace that communicates top ends of said first upward conveying subspace and said first downward conveying subspace, and
  a first lower communicating subspace that communicates bottom ends of said first upward conveying subspace and said first downward conveying subspace;
 said first upward conveying subspace and said first downward conveying subspace are stored with said charging seats;
 said first pushing device of said first conveying unit is disposed at said first lower communicating subspace and is located under said first upward conveying subspace;
 said first movement limiting device of said first conveying unit is located under and abuts against a lowermost one of said charging seats that are stored in said first upward conveying subspace; and
 said first conveying unit further includes
  a first blocking device that is disposed at said first charging station of said first battery charging unit, that is located under a lowermost one of said charging seats stored in said first downward conveying subspace, and that is convertible between a blocking state, in which said first blocking device carries said charging seats stored in said first downward conveying subspace and prevents said charging seats stored in said first downward conveying subspace from leaving said first downward conveying subspace, and an unblocking state, in which said first blocking device allows said charging seats stored in said first downward conveying subspace to leave said first downward conveying subspace, and
  a first carrying device that is disposed at said first lower communicating subspace, that is located under said first downward conveying subspace, and that is operable to move upwardly to carry said charging seats stored in said first downward conveying subspace, and to move downwardly to convey the lowermost one of said charging seats stored in said first downward conveying subspace to said first lower communicating subspace.

4. The battery charging and swapping system as claimed in claim 3, wherein:
 said at least one first battery charging apparatus of said battery charging subsystem includes a plurality of first battery charging apparatuses that are arranged in the front-rear direction;
 said battery charging subsystem further includes at least one lower conveying apparatus that is disposed at said first lower communicating subspace of said first battery charging unit of one of said first battery charging apparatuses;
 for each first battery charging apparatus, each of said first upward conveying subspace and said first downward conveying subspace of said first conveying space is configured to be straight;
 for each first battery charging apparatus, said charging seats that are stored in each of said first upward conveying subspace and said first downward conveying subspace are stacked in the up-down direction;
 for each first battery charging apparatus, when said first pushing device of said first conveying unit pushes said charging seats that are in said first conveying space, an uppermost one of said charging seats that are stored in said first upward conveying subspace enters said first upper communicating subspace of said first conveying space;
 for each first battery charging apparatus, said first conveying unit further includes a first upper conveying device that is disposed at said first charging station of said first battery charging unit, and that is convertible between a conveying state, in which said first upper conveying device enters said first upper communicating subspace to carry the uppermost one of said charging seats that enters said first upper communicating subspace and to convey the uppermost one of said charging seats in the front-rear direction, and a releasing state, in which said first upper conveying device releases the uppermost one of said charging seats;
 said at least one lower conveying apparatus is operable to carry the lowermost one of said charging seats that is conveyed downwardly by said first carrying device of the one of said first battery charging apparatuses, and is operable to convey the lowermost one of said charging seats away from said first charging station of the one of said first battery charging apparatuses; and
 except for a rearmost one of said first battery charging apparatuses, said first carrying device of each one of said first battery charging apparatuses is operable to convey the lowermost one of said charging seats of said first battery charging apparatus rearwardly to said first pushing device of another one of said first battery charging apparatuses that is adjacent to said first battery charging apparatus and that is located at a rear side of said first battery charging apparatus.

5. The battery charging and swapping system as claimed in claim 4, wherein:
 said battery charging system further includes at least one second battery charging apparatus that has
  a second conveying space having
   a second upward conveying subspace and a second downward conveying subspace that are arranged opposite to said first upward conveying subspace and said first downward conveying subspace of each one of said first battery charging apparatuses in the front-rear direction,
   a second upper communicating subspace that communicates top ends of said second upward conveying subspace and said second downward conveying subspace, and a second lower communicating subspace that communicates bottom ends of said second upward conveying subspace and said second downward conveying subspace, and a second pushing device disposed at said second lower communicating subspace, located under said second upward conveying subspace, and having a same functionality as said first pushing device of each one of said first battery charging apparatuses.

6. The battery charging and swapping system as claimed in claim 5, wherein:

said at least one second battery charging apparatus of said battery charging system includes a plurality of second battery charging apparatuses that are arranged in the front-rear direction;

said second battery charging apparatuses and said first battery charging apparatuses are arranged in a left-right direction perpendicular to the up-down direction and the front-rear direction in a manner that said second upward conveying subspace and said second downward conveying subspace of each one of said second battery charging apparatuses respectively correspond in position to said first downward conveying subspace and said first upward conveying subspace of a respective one of said first battery charging apparatuses; and said at least one lower conveying apparatus of said battery charging subsystem extends into said second lower communicating subspace of one of said second battery charging apparatuses that is adjacent to said first battery charging apparatus, and is operable to convey the lowermost one of said charging seats stored in said first downward conveying subspace of said first battery charging apparatus to said second pushing device of the one of said second battery charging apparatuses so that said second pushing device of the one of said second battery charging apparatuses is operable to carry the lowermost one of said charging seats.

7. The battery charging and swapping system as claimed in claim 4, wherein each of said charging seats includes a seat body that is adapted for carrying one of the batteries, and adapted for being electrically coupled to the one of the batteries to charge the battery, a power receiving unit that is mounted to said seat body and that receives the electrical energy when electrically coupled to said first charging rail of one of said first battery charging apparatuses, and a charging control unit that is mounted to said seat body and that is adapted to supply the one of the batteries with the electrical energy received by said power receiving unit to charge the one of the batteries.

8. The battery charging and swapping system as claimed in claim 7, wherein:

for each first battery charging apparatus, said first charging rail includes two first electrode plates that are disposed in said first conveying space of said first charging station, that are spaced apart from each other, that are parallel to each other, and that cooperate with each other to supply the electrical energy;

for each first battery charging apparatus, each of said first electrode plates has a first upward section that extends in the up-down direction along said first upward conveying subspace of said first conveying space, a first downward section that extends in the up-down direction along said first downward conveying subspace of said first conveying space, and a first interconnecting section that interconnects top ends of said first upward section and said first downward section, and that extends in the front-rear direction in said first upper communicating subspace of said first conveying space;

for each charging seat, said power receiving unit includes a shaft that is mounted to said seat body, and that is rotatable relative to said seat body about an imaginary axis extending in a left-right direction perpendicular to the front-rear direction and the up-down direction, and two conductive members that are mounted to said shaft, that are diametrically opposite to each other with respect to the imaginary axis, that cooperate with each other to receive the electrical energy when respectively and electrically coupled to said first electrode plates of said first charging rail of one of said first battery charging apparatuses, and that are co-movable with said seat body along said first electrode plates; and for each charging seat, said shaft is rotatable relative to said first electrode plates of one of said first battery charging apparatuses such that said conductive members are convertible between a first tilting state, in which said conductive members cooperate with the imaginary axis to define an imaginary plane that is tilted at a first angle with respect to a reference horizontal surface so that said seat body is allowed to move upwardly along said first upward sections to said first interconnecting sections and rearwardly along said first interconnecting sections of said first electrode plates, and a second tilting state, in which the imaginary plane is tilted at a second angle with respect to the reference horizontal surface so that said seat body is allowed to move rearwardly along said first interconnecting sections to said first downward sections and downwardly along said first downward sections of said first electrode plates.

9. The battery charging and swapping system as claimed in claim 8, wherein for each charging seat, said power receiving unit further includes a shaft controlling member that is mounted to said seat body, that is connected to said shaft, and that is operable to urge said shaft to rotate to convert said conductive members between the first tilting state and the second tilting state.

10. The battery charging and swapping system as claimed in claim 8, wherein:

for each first battery charging apparatus, said first battery charging unit further includes two first blocking subunits that are disposed at said first charging station and that are configured to be elastic;

for each first battery charging apparatus, one of said first blocking subunits is located in said first upper communicating subspace of said first conveying space and is located below said first interconnecting sections of said first electrode plates, when one of said charging seats moves rearwardly along said first interconnecting sections of said first electrode plates, with said conductive members thereof in the first tilting state, and passes the one of said first blocking subunits, the one of said first blocking subunits elastically abutting against one of said conductive members of said charging seat that is adjacent thereto to urge said shaft of said charging seat to rotate relative to said seat body so that said conductive members are converted from the first tilting state to the second tilting state; and for each first battery charging apparatus, the other one of said first blocking subunits is located in said first lower communicating subspace of said first conveying space and is located at a rear of said first carrying device, when one of said charging seats is conveyed rearwardly by said first carrying device, with said conductive members thereof in the second tilting state, and passes the other one of said first blocking subunits, the other one of said first blocking subunits elastically abutting against one of said conductive members of said charging seat that is adjacent thereto to urge said shaft of said charging seat to rotate relative to said seat body so that said conductive members are converted from the second tilting state to the first tilting state.

11. The battery charging and swapping system as claimed in claim 3, further adapted for swapping another battery that is mounted to an electric vehicle for one of the batteries that is stored in said battery charging and swapping system, and further comprising a battery swapping subsystem that includes
- a first moving unit defining a first swapping path and operable to carry and convey said charging seats along the first swapping path so that said charging seats enter said first conveying space of said battery charging subsystem,
- a vehicle conveying unit adapted to carry and convey the electric vehicle, and
- a battery removing unit disposed on said first swapping path;
- wherein, when the electric vehicle that is mounted with the another battery is carried by said vehicle conveying unit and is located over said battery removing unit, said battery removing unit is operable to push one of said charging seats that is carried by said first moving unit upwardly such that the another battery is connected to and is carried by the one of said charging seats; and
- wherein, when the one of said charging seats is connected to the another battery that is mounted to the electric vehicle and when said vehicle conveying unit conveys the electric vehicle away from said battery removing unit, said battery removing unit is operable to urge the another battery to be removed from the electric vehicle, and is operable to convey the one of said charging seats that is connected to the another battery downwardly such that said first moving unit carries the one of said charging seats that is connected to the another battery.

12. The battery charging and swapping system as claimed in claim 11, wherein:
said battery charging subsystem further includes at least one lower conveying apparatus that is disposed at said first lower communicating subspace of said first battery charging unit of said first battery charging apparatus, that is operable to carry the lowermost one of said charging seats conveyed downwardly by said first carrying device of said first battery charging apparatus, and that is operable to convey the lowermost one of said charging seats away from said first charging station of said first battery charging apparatus;
the lowermost one of said charging seats carries one of the batteries when conveyed by said at least one lower conveying apparatus;
said battery swapping subsystem further includes
- a second moving unit that defines a second swapping path, and that is operable to carry and convey the lowermost one of said charging seats conveyed away from said first charging station by said at least one lower conveying apparatus along the second swapping path,
- a battery mounting unit that is disposed on said second swapping path, and that is operable to push the lowermost one of said charging seats upwardly when the lowermost one of said charging seats is carried by said second moving unit and is located over said battery mounting unit, and
- a shifting unit;

when the lowermost one of said charging seats that carries the one of the batteries is pushed upwardly by said battery mounting unit, said vehicle conveying unit is operable to convey the electric vehicle toward said battery mounting unit such that said battery mounting unit is operable to urge the one of the batteries to be mounted to the electric vehicle;
when the one of the batteries is mounted to the electric vehicle, said battery mounting unit is operable to move downwardly such that the one of the batteries and the lowermost one of said charging seats are separated, and is operable to place the lowermost one of said charging seats on said second moving unit so that said second moving unit conveys the lowermost one of said charging seats; and
said shifting unit is operable to convey the lowermost one of said charging seats that is separated from the one of the batteries from said second moving unit to said first moving unit such that said first moving unit is operable to convey the lowermost one of said charging seats to said battery removing unit.

* * * * *